(12) United States Patent
Kanner

(10) Patent No.: US 11,076,723 B2
(45) Date of Patent: Aug. 3, 2021

(54) TOUCH FREE SPICE DISPENSER

(71) Applicant: KANNOVATIONS LLC, St. Petersburg, FL (US)

(72) Inventor: Brian Kanner, St. Petersburg, FL (US)

(73) Assignee: KANNOVATIONS LLC, St. Petersburg, FL (US)

(*) Notice: Subject to any disclaimer, the term of this patent is extended or adjusted under 35 U.S.C. 154(b) by 451 days.

(21) Appl. No.: 15/751,206

(22) PCT Filed: Aug. 16, 2016

(86) PCT No.: PCT/US2016/047160
§ 371 (c)(1),
(2) Date: Feb. 8, 2018

(87) PCT Pub. No.: WO2017/031112
PCT Pub. Date: Feb. 23, 2017

(65) Prior Publication Data
US 2018/0228319 A1    Aug. 16, 2018

Related U.S. Application Data

(60) Provisional application No. 62/206,627, filed on Aug. 18, 2018, provisional application No. 62/251,477, filed on Nov. 5, 2015.

(51) Int. Cl.
*A47J 47/01* (2006.01)
*A47J 42/44* (2006.01)
(Continued)

(52) U.S. Cl.
CPC ............. *A47J 47/01* (2013.01); *A47J 42/26* (2013.01); *A47J 42/38* (2013.01); *A47J 42/44* (2013.01);
(Continued)

(58) Field of Classification Search
CPC ........ A47G 19/30; A47G 19/32; A47G 19/34; A47F 1/03; A47J 42/00; A47J 42/16;
(Continued)

(56) References Cited

U.S. PATENT DOCUMENTS 4,776,489 A   10/1988  Tarlow et al.
5,201,474 A    4/1993  Midden
(Continued)

FOREIGN PATENT DOCUMENTS

AU   2010200318 A1 *  8/2010   .............. A47J 42/46
CN   108067319 A   *  5/2018

OTHER PUBLICATIONS

Patent Cooperation Treaty (PCT), International Search Report and Written Opinion for Application PCT/US2016/047160 filed Aug. 16, 2016, dated Nov. 4, 2016, International Searching Authority, US.

*Primary Examiner* — Shelley M Self
*Assistant Examiner* — Jared O Brown
(74) *Attorney, Agent, or Firm* — McDonald Hopkins LLC

(57) ABSTRACT

A touch free, spice dispenser is provided including a container for holding spices, a holder for supporting the container on an external support, a grinding mechanism and a sensor for activating the grinding mechanism in response to the presence of an object. The container has an open end and a closed end. The holder includes an end cap for support of the container, a hook for engagement with a support member and a strap extending between the hook and the end cap. The grinding mechanism is positioned in the end cap of the holder and is in electrical communication with a contact pad located on the hook. The grinding mechanism includes a grinder plate and a motor to rotate the grinder plate in response to a signal received from the sensor. Holes in the grinder plate and apertures in the end cap allow for passage (Continued)

of the spices out of the dispenser. A support assembly is also provided for supporting the dispenser above a food item.

10 Claims, 22 Drawing Sheets

(51) Int. Cl.
- *A47J 42/26* (2006.01)
- *A47J 42/48* (2006.01)
- *A47J 47/04* (2006.01)
- *A47J 47/16* (2006.01)
- *A47J 42/38* (2006.01)
- *A47J 45/02* (2006.01)

(52) U.S. Cl.
CPC ............... *A47J 42/48* (2013.01); *A47J 47/04* (2013.01); *A47J 47/16* (2013.01); *A47J 45/02* (2013.01)

(58) Field of Classification Search
CPC .. A47J 42/26; A47J 42/36; A47J 42/38; A47J 42/44; A47J 42/48; A47J 47/01; A47J 47/04; A47J 47/16
See application file for complete search history.

(56) References Cited

U.S. PATENT DOCUMENTS

| | | | |
|---|---|---|---|
| 5,397,031 A * | 3/1995 | Jensen | A47J 36/2433 222/146.5 |
| 2003/0089423 A1* | 5/2003 | Barton | F25C 5/20 141/198 |
| 2006/0249531 A1* | 11/2006 | Litchfield | G07F 11/44 222/52 |
| 2009/0057344 A1 | 3/2009 | Henry | |
| 2010/0155415 A1* | 6/2010 | Ashrafzadeh | B67D 3/0009 222/1 |
| 2012/0211521 A1 | 8/2012 | Moeggenberg et al. | |
| 2013/0085599 A1* | 4/2013 | Nicol | G06Q 20/202 700/233 |
| 2013/0193246 A1 | 8/2013 | Roberts | |
| 2014/0018943 A1 | 1/2014 | Lee | |
| 2014/0034674 A1* | 2/2014 | Engels | B01F 7/00633 222/135 |
| 2014/0252149 A1* | 9/2014 | Ding | A47J 42/38 241/88.1 |
| 2015/0060481 A1* | 3/2015 | Murray | B65D 83/06 222/1 |
| 2016/0106262 A1* | 4/2016 | Mroue | A47J 42/30 241/79 |
| 2018/0279830 A1* | 10/2018 | Conti | A47J 42/40 |

* cited by examiner

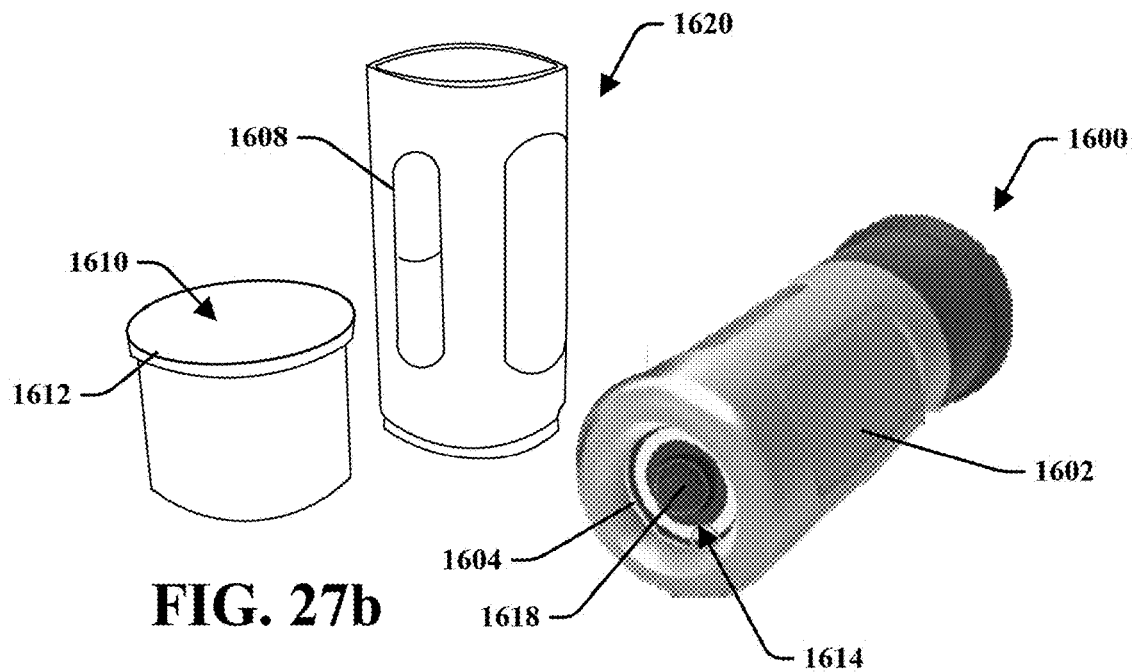
FIG. 27b
FIG. 27a
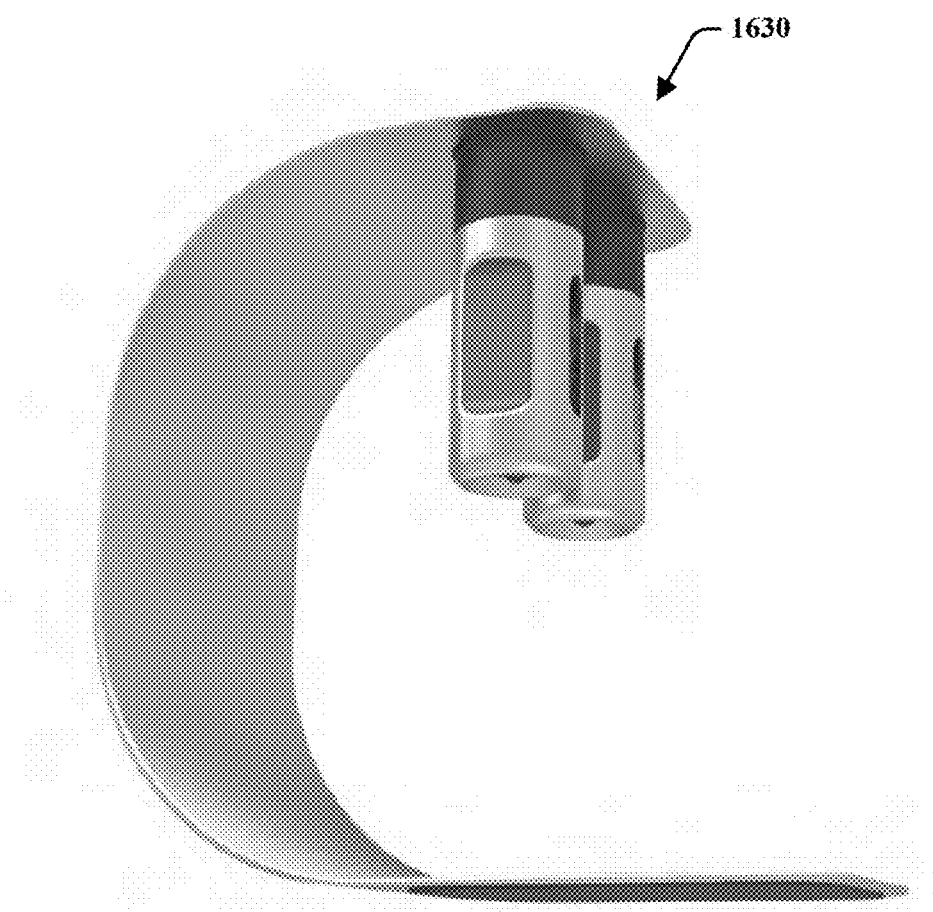
FIG. 28

TOUCH FREE SPICE DISPENSER

RELATED APPLICATIONS

This application is a 35 U.S.C. 371 national stage filing of PCT Application No. PCT/US2016/047160 filed Aug. 16, 2016, and entitled "TOUCH FREE SPICE DISPENSER", which claims the benefit of U.S. Provisional Patent Application Ser. No. 62/206,627, filed Aug. 18, 2015, and entitled "TOUCH FREE SPICE DISPENSER," and U.S. Provisional Patent Application Ser. No. 62/251,477, filed Nov. 5, 2015, and entitled "TOUCH FREE SPICE DISPENSER," the entirety of which are incorporated herein by reference.

FIELD OF THE INVENTION

The present disclosure relates generally to spice dispensers, more particularly, to a device for automatically dispensing spices in response to the presence of a target recipient.

BACKGROUND OF THE INVENTION

In many cooking procedures it is often desirable, and in some recipes even necessary, to add spices to a food item of a dish to enhance flavor, texture and/or appearance of the dish. The spices are often added by hand by pinching an appropriate amount out of a container and sprinkling the spice over the food item. In many instances, the spices have been pre-ground at a factory. When sold in bulk, such pre-ground spices are often supplied in sealed jars having holes in a lid or cover to form manual shakers to simplify the application of the spices to the food items.

Many spices have a limited shelf life after being ground, and lose their potency over time and after exposure to air. Thus, many professional and amateur chefs prefer to obtain spice in unground form and grind the spices themselves immediately prior to use. Manual grinding machines are available for these purposes. The manual devices receive the unground spices and are manually and physically manipulated to grind the spices for application to the food items. Additionally, many common spices, such as salt, various peppers, etc., are supplied and sold in individual, manual grinding dispensers for ease of use. Further, handheld, motorized spice grinding devices are known. For example, some common motorized spice grinders include a push button that, when pressed, operates the motorized spice grinder.

The Center for Disease Control ("CDC") estimates that the annual medical costs from food borne illnesses is around $365,000,000. Contaminated hands, utensils, or other object can contribute to the spread of these illnesses. For example, a user may handle raw meat with their hands. The user, in preparing the meat, may need to add spices from spice dispenser. If the user does not wash their hands before touching it, he may contaminate the spice dispenser. To prevent contamination, the CDC recommends that the user wash his hands for 20 seconds every time they contact the raw food. Further, the CDC recommends that utensils should be washed with hot soapy water or bleach water after use. Users, however, may not follow these guidelines. And following the guidelines may make food preparation less efficient. This is particularly true when users need to dispense spices while preparing raw food.

Accordingly, there is a need for an automatic, hands free spice dispenser for dispensing fresh spices over a dish.

SUMMARY OF THE INVENTION

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

The present disclosure describes touch free, spice dispensers and assemblies for automatically dispensing spices onto a target food item. In an example, a spice dispenser has a sensor that senses the position of the food item relative to the dispenser and actuates a motor to dispense spices onto the food item. A sensor may be actuated by the presence of part of the body of a user, for example a hand of the user. The assembly further includes a support assembly for suspending the spice dispenser above the food item. It is noted that the present disclosure describes various other sensors that may be actuated via other or different triggering events, such as voice activated sensors, heat sensors, or the like.

A spice dispensing assembly for dispensing spices is described herein. The spice dispenser includes a container that operatively houses spices, a motor coupled to the container; and a sensor coupled to the motor, wherein the motor operatively activates in response to the sensor sensing a triggering event. In another aspect, the spice dispensing assembly includes a support assembly that operatively supports the spice dispenser above a surface.

The disclosure also describes a spice dispensing assembly for dispensing spices. The spice dispensing assembly includes one or more spice dispensers comprising a container operatively storing a spice, a support assembly that supports the spice dispenser, one or more sensors coupled to at least one of the support assembly or the one or more spice dispensers for sensing a triggering event, and a dispensing mechanism that dispenses the spice in response to the one or more sensors sensing a triggering event.

In another aspect, the disclosure describes a spice dispenser for dispensing spices. The spice dispenser includes a container operatively receiving spices, a sensor operatively sensing a triggering event, and a dispensing mechanism that operatively dispenses the spices from within the container in response to the sensor sensing the triggering event.

These and other objects, features, and advantages of the present disclosure will become more readily apparent from the attached drawings and the detailed description of the preferred embodiments, which follow.

BRIEF DESCRIPTION OF THE DRAWINGS

Objects and advantages together with the operation of the invention may be better understood by reference to the following detailed description taken in connection with the following illustrations, wherein:

FIG. 27a presents a bottom perspective view of a spice dispenser comprising a light in accordance with embodiments of the present disclosure;

FIG. 27b presents a container and a lid of the spice dispenser of FIG. 27a in accordance with embodiments of the present disclosure;

FIG. 28 presents a side perspective view of the spice dispensers of FIGS. 27a and 27b positioned on a support assembly in accordance with embodiments of the present disclosure;

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the disclosure as oriented in the various figures.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
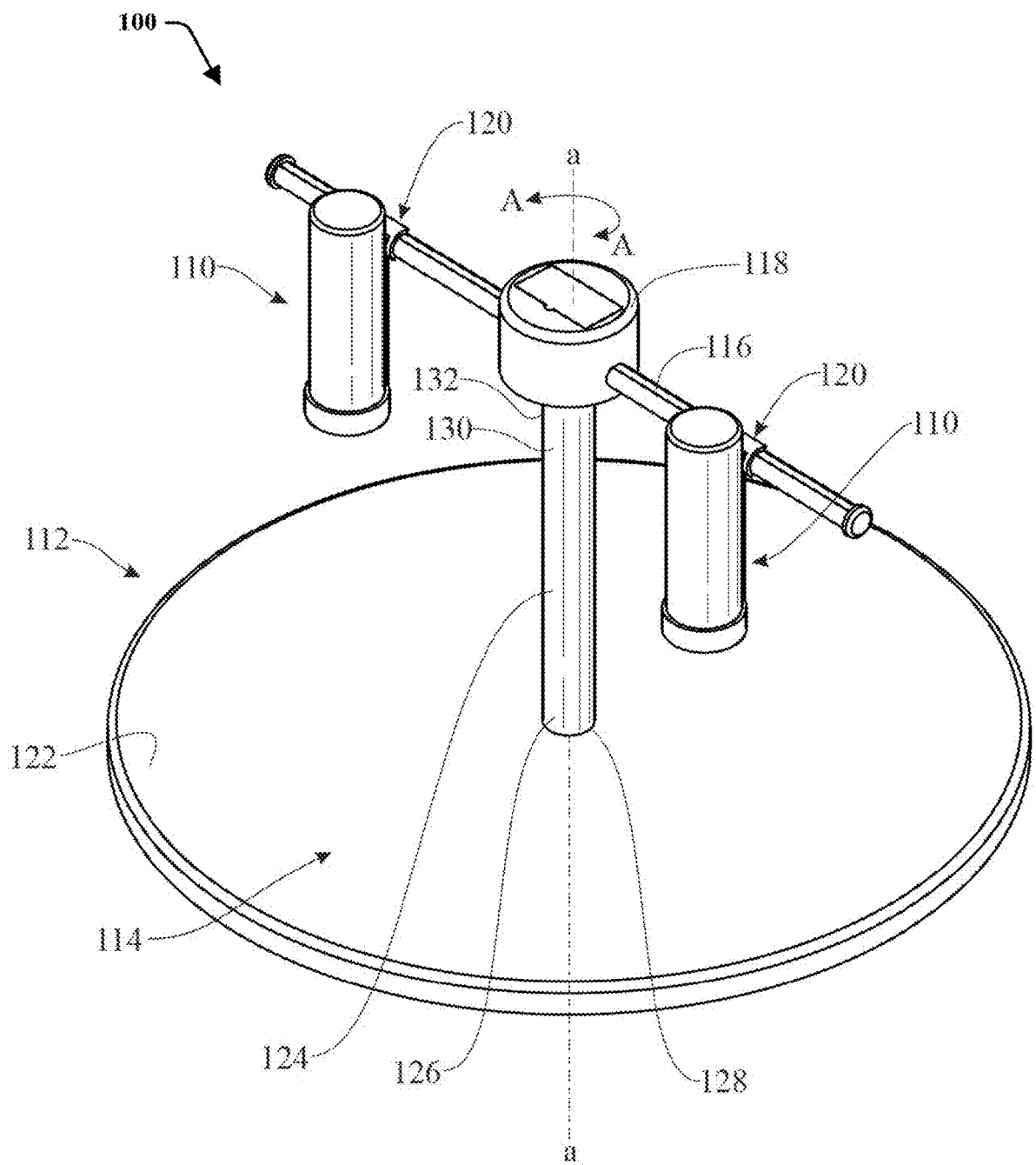
FIG. 1 presents a top perspective view showing a first pair of automatic spice dispensers of the present disclosure positioned on an elevated support.
Figure 2:
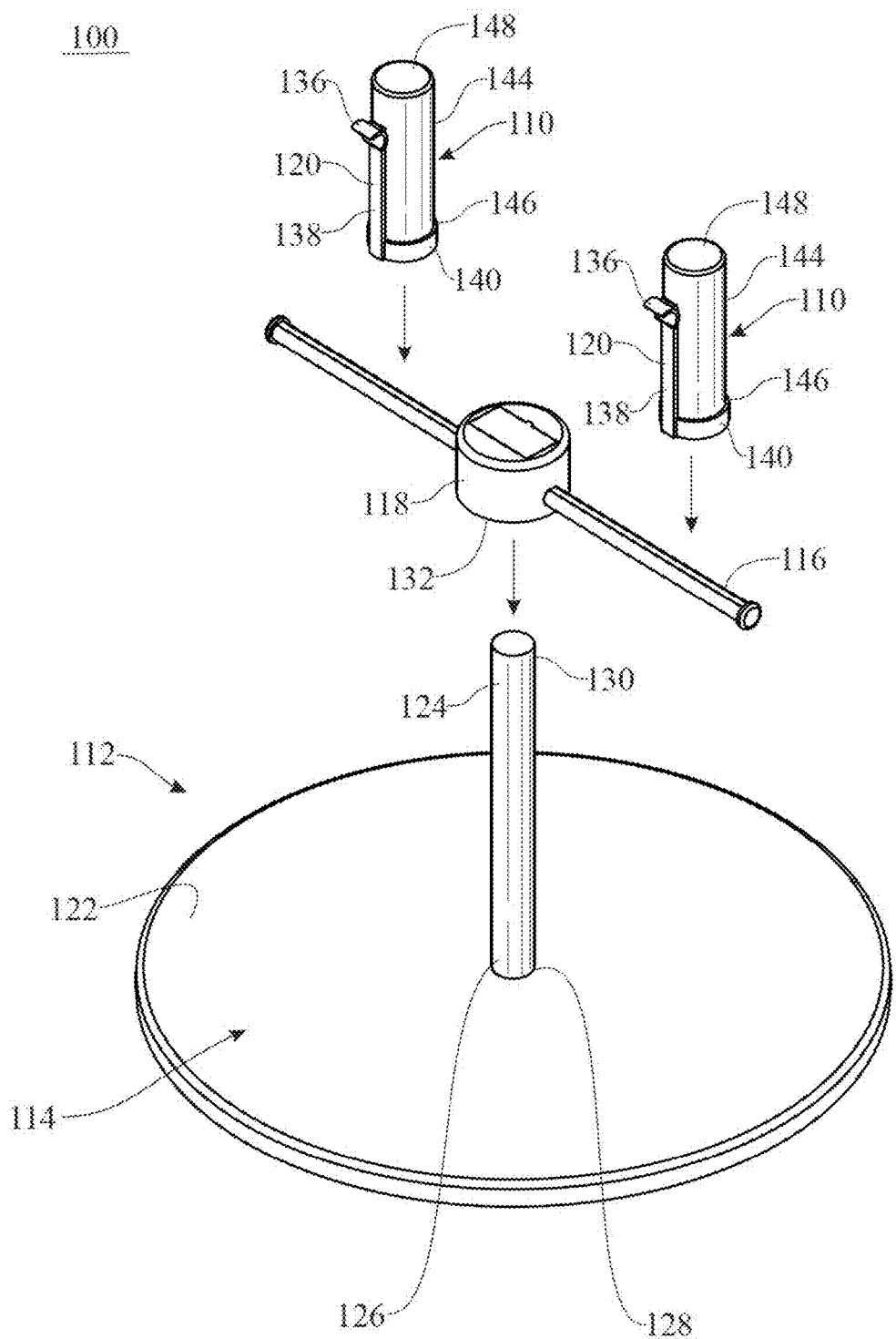
FIG. 2 presents a top perspective view of the pair of automatic spice dispensers of FIG. 1 from the elevated support.

Referring initially to FIGS. 1 and 2, a touch free, spice dispensing assembly 100 is illustrated in accordance with an exemplary embodiment of the present disclosure. The spice dispensing assembly 100 may comprise an automatic, touch free spice dispenser. As shown, the dispenser assembly 100 may generally include one or more spice dispensers 110 and a support assembly 112. While two spice dispensers 110 are shown, any number of dispensers 110 may be utilized. In another aspect, the spice dispensers 110 may be operatively supported by the support assembly 112. In an example, the spice dispensers 110 may be suspended or disposed above a surface such that a target food item or container may be placed beneath a spice dispenser 110. It is further noted that automatic and touch free generally refer to dispensing/grinding without requiring a user to press a physical actuator, press a touch screen, and/or operate a mechanical device by hand.

The support assembly 112 generally includes a main base 114 and an elevated support rod 116 for suspending and positioning the spice dispensers 110 above a target food item. It is noted that the distance between the main base 114 and the support rod 116 may be adjustable. In another aspect, the distance may be within a range that allows the spice dispensing assembly 100 to fit between a counter top and cabinets. A support shaft 124 may support or hold the support rod 106 above the main base 114. A swivel mechanism 118 may be included in the support assembly 112. The support rod 116 may be affixed to and pass through the swivel mechanism 118. The swivel mechanism 118 connects the support rod 116 to the main base 112 via the support shaft 124. The swivel mechanism 118 may allow the support rod 116 to rotate about axis a-a. Various other appropriate suspending structures may be used to elevate or suspend the disclosed spice dispensing assembly, as described herein. Moreover, embodiments may include other mechanisms for attaching the support rod 116 to the main base 112.

Each of the spice dispensers 110 may include an attachment member 120 for respectively supporting each dispenser 110 on the support rod 116 of the support assembly 112 and above a target food item. The attachment members 120 may be removably attachable to the support rod 116. In another aspect, the attachment members 120 can be selectively positionable along the length of the support rod 116. For example, a user may remove a spice dispenser 110 to change batteries, change and/or add spices, set at a table, hold in their hand for use, or the like. It is further noted that the attachment members 120 may include hooks, clasps, magnets, VELCRO®, and/or other appropriate fasteners. In another aspect, the attachment members 120 may be operatively attached with and/or unitarily formed with the dispensers 110.

In this and various other embodiments, the support assembly 112 is designed to rest on a surface, such as counter top or table. The support base 114 may include a relatively flat, base plate 122. The base plate 122 may comprise an elliptical, circular, polygonal, or other shape. The support shaft 124 may extend upwards from the base plate 122. The support shaft 124 may be cylindrical, rectangular, flattened, or various other shapes. It is noted that the base plate 122 and the support shaft 124 may comprise a metallic, plastic, wood, or other material. It is further noted that the base plate 122 and the support shaft 124 may be separate components, unitarily formed, removably attached, or otherwise assembled together.

In embodiments, a first end 126 of the support shaft 124 may be affixed to a generally central portion 128 of the base plate 122 and a second end 130 of the support shaft 124 may be mounted to an underside 132 of the swivel mechanism 118. With specific reference to FIG. 3, the second end 130 of the support shaft 124 sits within in a hole 134 formed in the underside 132 of the swivel mechanism 118. The swivel mechanism 118, and thus the support rod 116 and attached spice dispensers 110, are free to rotate or pivot in the directions of arrow "A" about a longitudinal axis a-a (FIG. 1) of the support shaft 124 to selectively position the spice dispensers 110 above a target food item.

Figure 3:
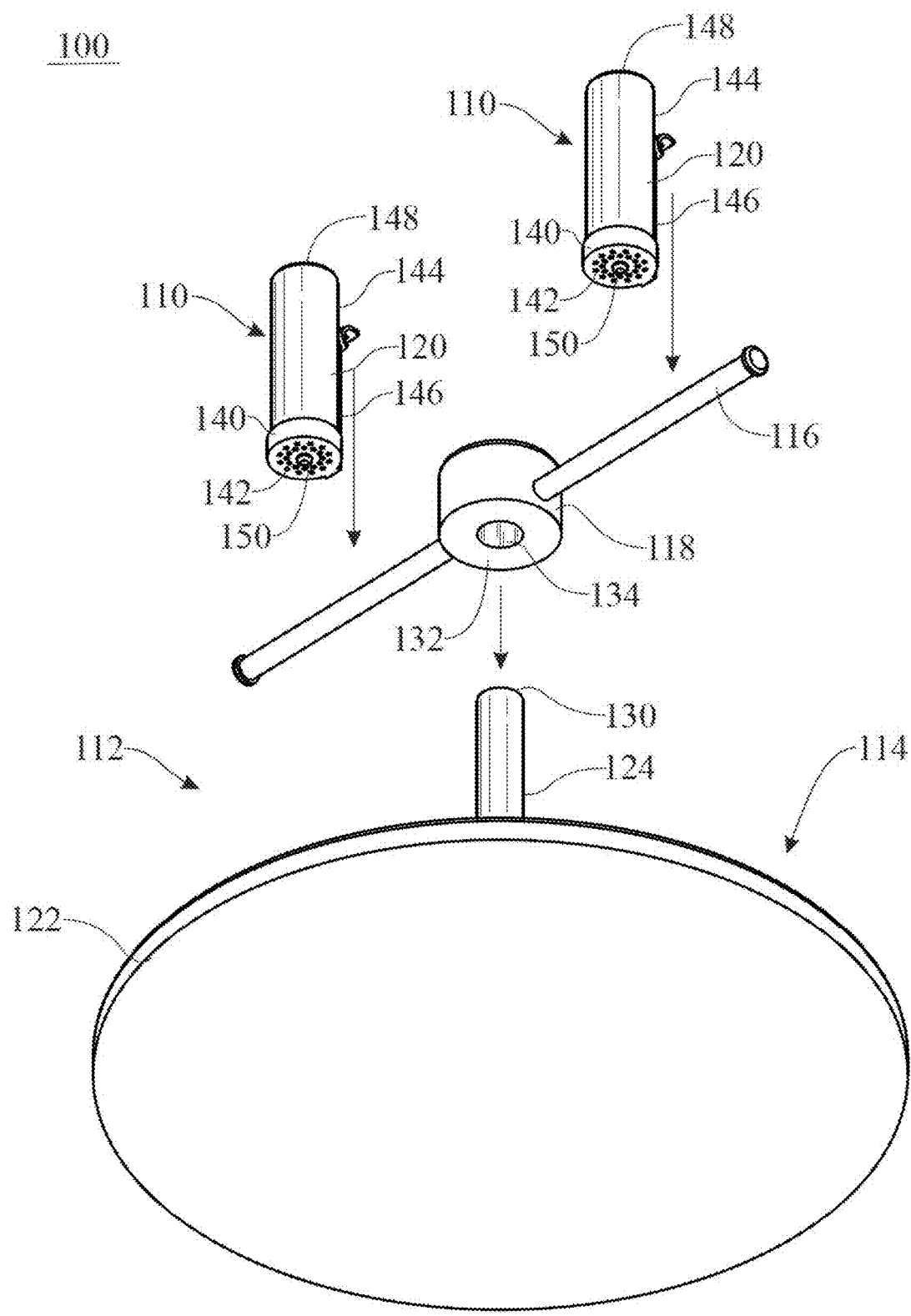
FIG. 3 presents a bottom perspective view of the first embodiment of the pair of automatic spice dispensers of FIG. 1 separated from the elevated support.

With specific reference to FIG. 2, the attachment members 120 generally include a support connector or support hook 136, an arm or strap 138 extending from the support hook 136 and an end cap 140 suspended from the strap 138. As shown in FIG. 3, openings or apertures 142 are provided in the end cap 140 to operatively release spices, as described in more detail herein.

Referring to FIG. 2, the attachment members 120 are provided to support the spice dispensers 110 on the support rod 116 for dispensing spice onto a target, such as a target food item. The spice dispensers 110 may include containers 144, which contain ground or unground spices. The containers 144 include open first ends 146 supported within the end caps 140 of the attachment members 120 and a closed second end 148. The containers 144 may be removable from the attachment members 120 to allow a user to interchange the spices desired to be dispensed and/or refill the cylindrical containers with fresh ground or unground spices. In another aspect, the containers 144 may comprise a removable cap that may allow a user to add or remove spices.

It is noted that the containers 144 may comprise various materials, such as glass, steal, plastic, or other materials. The containers 144 may be generally cylindrical, rectangular, conical, or otherwise shaped. Moreover, the containers 144 may comprise an ergonomic gripping portion. In at least one embodiment, the containers 144 may comprise indicia that identify gradient markings and/or spice levels. Various other containers and/or spice dispensers are described herein. It is noted that aspects of the various containers/spice dispensers may be combined or arranged in numerous ways in accordance with this disclosure.

Figure 4:
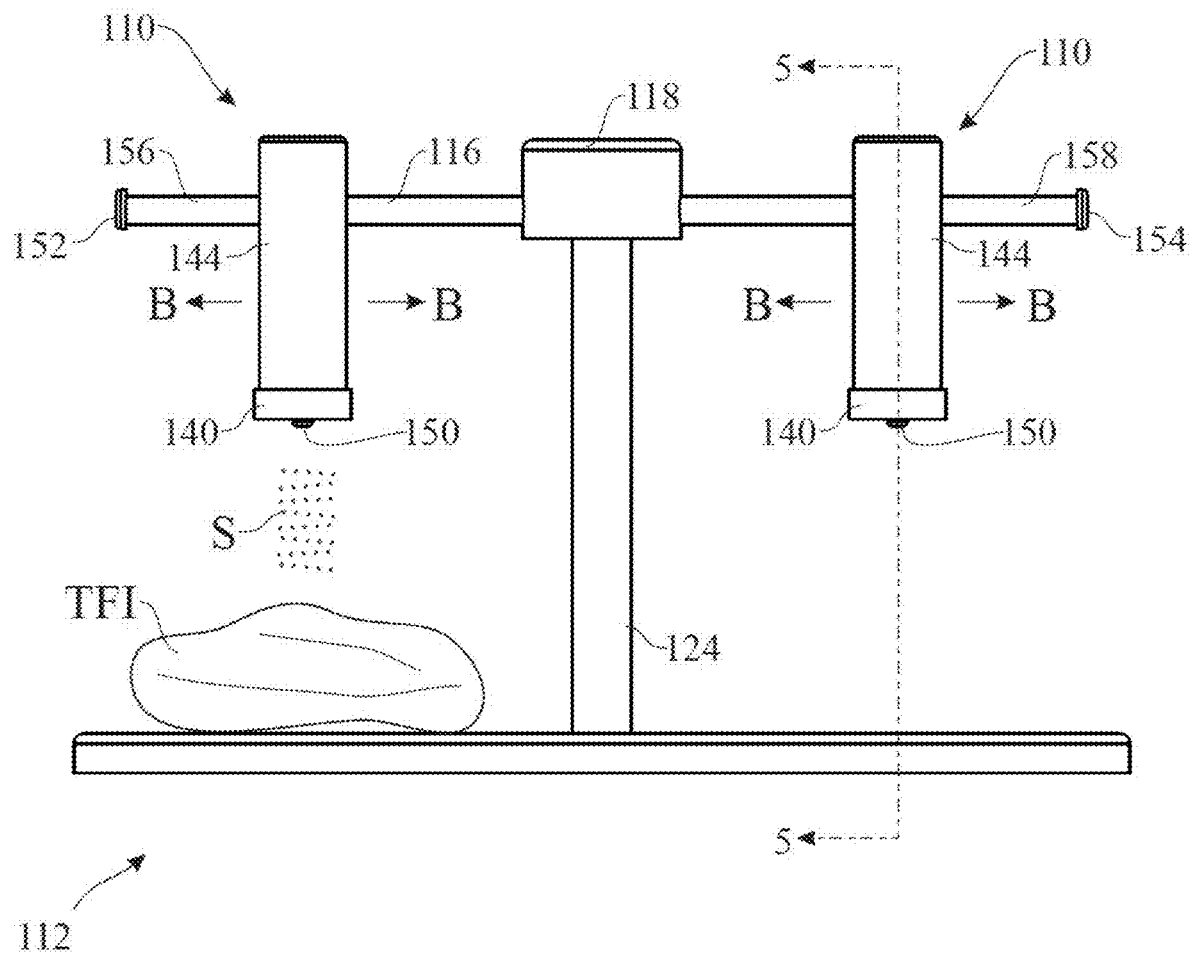
FIG. 4 presents a side view of the pair of automatic spice grinding dispensers of FIG. 1.

Referring to FIGS. 3 and 4, in order to automatically release spice from the spice dispensers 110, the spice dispensers 110 each include a sensor 150, which senses or detects objects, such as a target food item, an operator's hand or arm, etc. passed over or in proximity to the sensor 150. The sensors 150 can be of the type that detects a triggering event. The triggering event may comprise motion, heat differentials or simply the presence of an object within a preprogrammed proximity to the sensor 150. For instance, the sensors 150 may include reflective sensors, inductive sensors, capacitive sensors, capacitive displacement sensors, magnetic sensors, or the like. In an embodiment, the sensors 150 may comprise infrared sensors 150 mounted to the end caps 140 of the spice dispensers 110 such that the presence of a target item such as, target food item "TFI" (FIG. 4) or container (e.g., pot, pan, bowl, etc.), receives the dispensed spices ("S"). It is noted that the sensor 150 may take any appropriate form and may be disposed at appropriate locations to sense an object. In another aspect, sensor 150 may determine which spice dispenser 110 to active for dispensing of a spice based on motion detection and/or position of a spice dispenser 110. As described herein, the sensors may be disposed at various other locations.

With specific reference to FIG. 4, in use, as the TFI is positioned beneath one of the dispensers 110, the infrared sensor 150 detects the TFI and releases the spice S onto the TFI. Alternatively, the TFI can be placed on the base plate 122 of the support assembly 112 and the desired spice dispenser 110 moved over the stationary TFI by rotating the support rod 116 and swivel mechanism 118 relative to the support shaft 124. In this method, the sensor 150 is moved over the TFI rather than moving the TFI under the sensor 150. Alternatively, it is noted that the disclosed spice dispenser 110 does not have to be suspended by a stand and could be instead manually held to automatically sense and dispense spices. Furthermore, the disclosed spice dispenser could include attachment structures to suspend and attach the spice dispenser from a cable or rope. For example, the spice dispensers 110 may be suspended from a retractable rope. The rope may be attached to an underside of a cabinet. A user may grasp the dispenser and position it above a desired target.

According to at least one embodiment, the support assembly 112 may include one or more sensors, such as sensor 150. For instance, support assembly 112 may include a motion sensor disposed at or within base plate 122 and/or support rod 116. In another aspect, base plate 122 may include a weight sensor. The weight sensor may monitor changes in weight to activate a spice dispenser 110. In an example, a user may prepare food in a heavy pot. The user may wish to set the pot down while spice is disposed from the spice dispenser 110. When the user places the pot on the base plate 122, the spice dispenser 110 may automatically dispense the spice into the pot. It is noted that touch free spice dispensing assembly 100 may utilize both the weight sensor and the sensor 150 (e.g., a motion sensor) to trigger activation of the spice dispenser 110. Such may allow for reduced or prevented unintentional dispensing. For instance, the assembly 100 may require activation of both a weight sensor and a motion sensor prior to dispensing the spice.

As noted hereinabove, the spice dispensers 110 are selectively positionable and can slide or move along the support rod 116 in the directions of arrows "B" to position the spice dispensers 110 over an expected target path of the TFI (FIG. 4). End buttons 152 and 154 provided at respective first and second ends 156 and 158 of the support rod 116 prevent the spice dispensers 110 from sliding off the first and/or second ends 156, 158 of the support rod 116. It should also be noted that, the individual spice dispensers 110 are individually movable along the support rod 116 to position the individual spice dispensers 110 at differing distances from the swivel mechanism 118. This allows the individual spice dispensers 110 to contain different spices from each other and apply them automatically to the TFI without having to change out the spice dispensers 110 or the containers 144 for others containing different spices. Additionally, while the disclosed touch free, spice grinding assembly 100 has been illustrated with two spice dispensers 110, each positioned on an opposite side of the swivel mechanism 118, it should be noted that more or fewer spice dispensers 110 may be provided on the support rod 116. For example, one or a plurality of spice dispensers 110 may be provided on the support rod 116 on one side of the swivel mechanism 118. It is further noted that swivel mechanism 118 may be motorized to allow for hands free swiveling of spice dispensers 110.

It is noted that various described embodiments may utilize any number of sensors 150. For example, each spice dispenser 110 may comprise one or more sensors 150 and/or each support assembly 112/300 may comprise one or more sensors 150. In an aspect, described touch free spice dispenser assemblies (e.g., as shown in the various figures) may determine which spice dispenser 110 a user intends to operate. For instance, a user may prepare food in a casserole pan, baking sheet, or other object that may be within a line of sight of multiple sensors and/or spice dispensers 110. Thus, described embodiments may provide for selection of one or more of the spice dispensers 110. In an example, selection of a spice dispenser 110 may comprise sensors 150 detecting a user waiving at a desired spice dispenser 110, and the user placing a target food item underneath the desired spice dispensers. Embodiments may dispense spice from any spice dispenser 110 to which the user waived, and may prevent or forgo dispensing from spice dispensers 110 to which the user did not waive. It is noted that described embodiments may utilize various other signals and/or combinations of actions to select a spice dispenser 110, such as waiving from left to right, right to left, up to down, etc.

Described spice dispenser assemblies may utilize audio sensors as sensor(s) 150, such as MEMS microphones to detect motion and/or sound. The audio sensors may be configured to recognize (e.g., via a processor and a memory) audible commands to allow a user to operate the spice dispenser assemblies. For example, a user may select a spice dispenser 110 for dispensing by saying a type of spice that is in the spice dispenser 110 (e.g., "black pepper," "salt," etc.), a position of the spice dispenser 110 (e.g., "position 1," "right," "left," etc.), or the like. In another example, a user may select parameters for dispensing and/or grinding of spices. For instance, the user may select a grind granularity (e.g., course, fine, etc.), an amount to dispense (e.g., pinch, teaspoon, gram, etc.), a type of dispensing (e.g., sprinkle, pour, continuous, etc.), or the like.

It is noted that the audio sensors may be comprised within the spice dispenser assemblies (e.g., within a spice dispenser 110, a support assembly 112/300, etc.) or may be comprised by a separate device. For instance, described spice dispenser assemblies may comprise wireless and/or wired communication devices that may enable the spice dispenser assemblies to communicate with user devices via a communication framework. Embodiments may utilize substantially any wired or wireless network. As an example, a spice dispenser 110 may utilize various radio access network (RAN), e.g., Wi-Fi, global system for mobile communications, universal mobile telecommunications systems, worldwide interoperability for microwave access, enhanced general packet radio service, third generation partnership project long term evolution (3G LTE), fourth generation long term evolution (4G LTE), third generation partnership project 2, BLUETOOTH®, ultra mobile broadband, high speed packet access, $x^{th}$ generation long term evolution, or another IEEE 802.XX technology. Furthermore, embodiments may utilize wired communications. For brevity, spice dispenser 110 is described as communicating via a communications network. However, it is noted that spice dispenser 110 may be coupled with a support assembly 112/300, and the support assembly may communicate with the network.

It is further noted that the terms "user equipment," "device," "user device," and the like are utilized interchangeably in the subject application, unless context warrants particular distinction(s) among the terms. Such terms may refer to a network component(s) or appliance(s) that sends or receives data, voice, video, sound, or substantially any data-stream or signaling-stream to or from network components and/or other devices. By way of example, a user equipment device may comprise an electronic device capable of wirelessly sending and receiving data. A user equipment device may have a processor, a memory, a transceiver, an input, and an output. Examples of such devices include cellular telephones (e.g., smart phones), personal digital assistants (PDAs), portable computers, tablet computers (tablets), handheld gaming counsels, wearables (e.g., smart watches), desktop computers, stand-alone voice command devices or home automation device (e.g., AMAZON ECHO, Z WAVE, etc.), spice dispenser assemblies, etc.

It is noted that user devices can communicate with each other and with other devices (e.g., spice dispenser assemblies) via a network, for instance, a wireless or a wireline network. A "network" can include broadband wide-area networks such as cellular networks, local-area networks, wireless local-area networks (e.g., Wi-Fi), and personal area networks, such as near-field communication networks including BLUETOOTH®. Communication across a network may include packet-based communications, radio and frequency/amplitude modulations networks, and the likes. Communication may be enabled by hardware elements called "transceivers." Transceivers may be configured for specific networks and a user equipment device may have any number of transceivers configured for various networks. For instance, a smart phone may include a cellular transceiver, a Wi-Fi transceiver, a BLUETOOTH® transceiver, or may be hardwired. In those embodiments in which it is hardwired, any appropriate kind or type of networking cables may be utilized. For example, USB cables, dedicated wires, coaxial cables, optical fiber cables, twisted pair cables, Ethernet, HDMI and the like.

In an example, spice dispensing assembly 400 may comprise a wireless component that may allow spice dispensing assembly 400 to wirelessly communicate with a user device (e.g., smart phone, tablet, stand-alone voice command device, etc.). A user may utilize the user device to input a command and the user device may transmit an instruction to the spice dispensing assembly 400 based on the user input. For example, a user may utilize a voice activation feature of a user device to activate spice dispensing assembly 400 by saying, "Device, have the spice dispenser dispense the spice needed for Mom's chicken recipe." The user device may receive this input and generate a command and/or instructions to be sent to the spice dispensing assembly 400. Spice dispensing assembly 400 may then dispense the spice (e.g., immediately, based on sensor 150 input, based on user input, etc.). It is noted that a user may provide other input to a user device, such as via a touch screen, mouse, keyboard, or the like. In another aspect, the user device may comprise image sensors that may recognize commands based on images. For instance, a user may wave a hand or make some gesture that may be recognized by the user device. The user device may then generate commands/instructions to control spice dispensing assembly 400.

It is noted that the audio sensors may be configured to recognize predetermined commands and/or may be customized based on a user's preferences. It is further noted that the audio sensors may utilize a "trigger" that activates a listening process. For instance, when preparing food, users may often say "salt" or "pass the salt." To avoid accidental dispensing, spice dispenser assemblies may be configured to recognize an initial trigger (e.g., "Hi dispenser," a click, a whistle, etc.) that alerts the spice dispenser assemblies that the user wishes to enter a command. While the above examples have been described with reference to audio, weight, or motion sensors, it is noted that the embodiments may utilize multiple sensors and/or types of sensors.

In some embodiments, the described spice dispenser assemblies may verify a user's selection, such as through visual displays and/or audio conformation. For instance, a spice dispenser 110 may flash one or more LEDs to indicate reception of a user's command. In another example, a spice dispenser 110 may output a selection to a display screen housed on the cylindrical container 144 and/or support assembly 112.

Disclosed embodiments of the spice dispenser assemblies may allow a user to select parameters for dispensing and/or parameters associated with spice dispensers 110. The parameters for dispensing may include a quantity for dispensing, a granularity of a grind, dispensing speeds, types of dispensing (e.g., sprinkle, pour, continuous, etc.) or the like. The parameters associated with the spice dispenser 110 may include a date on which the spice dispenser 110 was last filled, a type of spice within the spice dispenser 110, or the like. It is noted that spice dispenser 110 may include odor sensors (e.g., electronic noise sensors) that may sample a head space of an environment and may apply pattern recognition to identify a spice within a spice dispenser 110.

In at least one embodiment, spice dispenser(s) 110 may store recipes or custom dispensing operations for a user. For instance, spice dispenser 110 may receive a recipe from a user (e.g., via user input, user device, internet connection, or the like). The recipe may be saved in a memory device of spice dispenser 110 and/or a spice dispensing assembly. A user may then select a recipe for dispensing spices. Thus, a user need not know or remember the quantity of spice needed for a particular recipe. Rather, the user may merely provide input (e.g., via a user interface device, audio sensor, etc.) to select a recipe and the spice dispenser 110 may automatically determine parameters for dispensing.

In this manner, the disclosed spice dispensers along with the interchangeable support assemblies form a useful touch free method of grinding and/or dispensing spices onto a target food item. While the disclosed spice dispensers are described as touch free, it is noted that the spice dispensers may comprise physical press buttons or other user controls to allow for touch operation.

Figure 5:
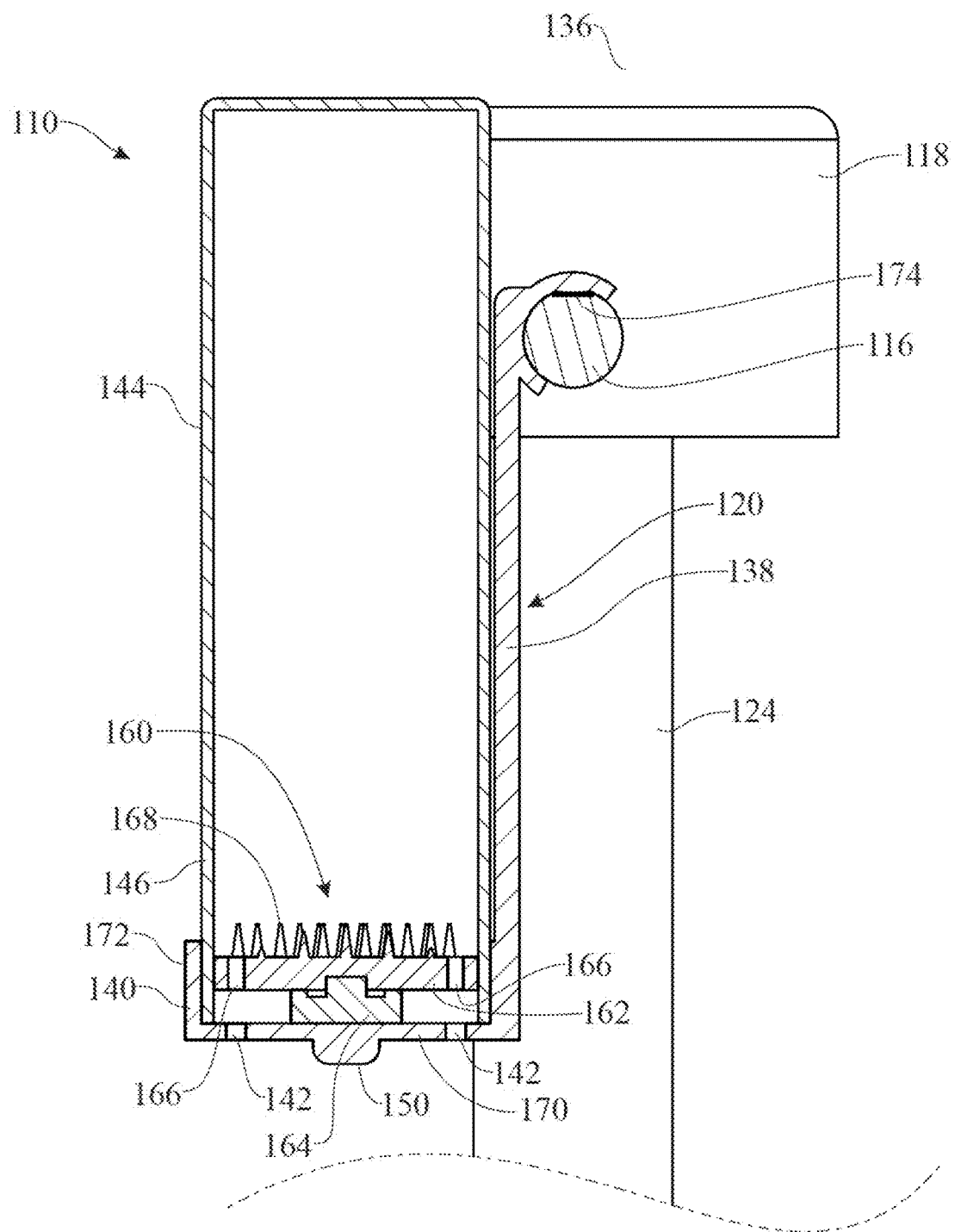
FIG. 5 presents a side sectional view of the automatic spice dispenser of FIG. 2 supported on the elevated support.

Referring now to FIG. 5, further details of the spice dispensers 110 will now be described. While the previous description has been given with regard to the pair of the spice dispensers 110, the following detailed description will be given with regard to an individual spice dispenser 110. In embodiments, the spice dispenser 110 generally includes a dispensing or grinding mechanism 160 including a grinder plate 162 and a motor 164 to rotate the grinder plate relative to the end cap 140 of the attachment member 120. The motor 164 is attached to the grinder plate 162 and rests within the end cap 140. The grinder plate 162 includes holes 166 to pass spices contained in the cylindrical container 144 to the apertures 142 in the end cap 140 for dispensing onto the TFI.

The grinding mechanism 160 of the spice dispenser 110 may include upward facing grinding teeth 168 extending from the grinder plate 162. As the motor 164 operatively rotates the grinder plate 162, the grinding teeth 168 grind spices contained within cylindrical container 144. The ground up spices pass through the holes 166 in the grinder plate 162 and out the apertures 142 in the end cap 140 of the attachment member 120 for dispensing onto the TFI's. The motor 164 or any grinding action provided by the disclosed spice dispenser 110 may be actuated in response to sensing an object via the one or more of the sensors 150. It is noted that any appropriate grinding mechanism can be used without departing from the scope of the disclosure. In an example, a plurality of blades may be configured to appropriately grind spices. It is noted that the grinding mechanism 160 may not grind spices. For instance, the motor 164 may drive teeth 168 or other mechanisms that agitate or otherwise cause spices to be dispensed from the spice dispenser 110. Some spices may comprise fine particles that may not need to be ground. As such, the teeth 168 may force the spice out the apertures 142 without grinding them.

In at least one embodiment, the spice dispenser 110 may be used without incorporating the grinding teeth 168 or with finely ground spices such that the spice dispenser 110 performs no actual grinding function. In this mode, the rotating grinder plate 162 acts as a gate through which the pre-ground spices are allowed to pass through the holes 166 in the grinder plate and out the apertures 142 in the end cap 140 in response to actuation of the sensor 150. For example, when a sensor detects an object, the spice dispenser 110 releases spices through the holes 166 by rotating grinder plate 162. In some embodiments, pneumatic mechanics may be included to pressurably dispense spices.

The end cap 140 of the attachment member 120 may include an end plate 170 and a circumferential side wall 172 that may support the container 144 on the attachment member 120. The open first end 146 of the container 144 is removably retained against the end plate 170 and within the circumferential side wall 172. As shown, the apertures 142 extend through the end plate 170 and the sensor 150 is positioned on the end plate 170. The sensor 150 may be attached to the end plate 170 by known means or may be molded within the body of the end plate 170.

The spice dispenser 110 may be supported on the support rod 116 of the support assembly 112 by the support hook 136 of the attachment member 120. The support hook 136 engages the support rod 116 in friction fit fashion while allowing the attachment member 120 to be slid along the length of the support rod. In order to power the motor 164, a contact pad 174 is incorporated into the support hook 136. The motor 164 and the sensor 150 are in electrical communication with the contact pad 174. The contact pad 174 receives power from the support rod 116 (which in turn receives the power from an external source) and passes it through the attachment member 120 to the motor 164 resting on the end plate 170 of the attachment member 120. Alternatively, a self-contained battery may be provided within the spice dispenser 110 to power the motor 164 and the sensor 150. Such a battery may be disposed at any appropriate location of the disclosed spice dispenser 110 and any supporting elements. Additionally or alternatively, power may be obtained via an induction charger, a power-mat using inductive power technology, or other contactless power technology. Furthermore, the grinding mechanism or the grinder plate 162 may be magnetically or electromagnetically driven, actuated, or rotated via a magnetic field, magnetic flux, magnetic rotor, or any appropriate magnetic drive. For example, a homopolar magnetic or electromagnetic motor may be included to rotate the grinder plate 162.

In one embodiment, the attachment member 120 acts as a support for the cylindrical container 144. It is noted that the spice dispensers 110 may comprise individual, independent disposable spice grinders sold in stores for grinding and dispensing pepper, salt and the like. In this configuration, the motor 164 rotates the attachment member 120, and more specifically the end cap 140 of the attachment member 120 relative to the strap 138 of the attachment member 120. The independent spice grinder is positioned on the attachment member 120 in place of the cylindrical container 144 and the independent spice grinder held stationary against the strap 138. Actuation of the motor 164 in response to the sensor 150 would rotate the end cap 140 and a grinding head of the independent spice grinder to grind and dispense spices to a TFI. The end cap 140 or attachment member 120 may include a gripping mechanism to grip a rotatable head of a common independent spice grinder. For example, a radius, circumference, or shape of the end cap 140 may be adjusted to appropriately grip a grinding head of a common independent spice grinder such that any spice grinder can be actuated to grind spices in response to the disclosed sensor system sensing an appropriate object as described herein.

The spice dispenser 110 and, more particularly, the attachment member 120 and the container 144, may be formed from a variety of materials such as, for example, plastics or polymeric materials, metallic materials, ceramic or glass, etc. The materials chosen can depend on whether the component is to be permanent or disposable, removable for cleaning, anti-corrosive, etc. In the situation of the attachment member 120, non-conductive and/or conductive materials may be used to convey power from the contact pad 174 to the motor 164 and a signal from the sensor 150 to the motor 164. For example, a main body of the holder may be formed from a non-conductive material, such as a plastic, molded around or incorporating a conductive material such as stainless steel.

Figures 6, 7:
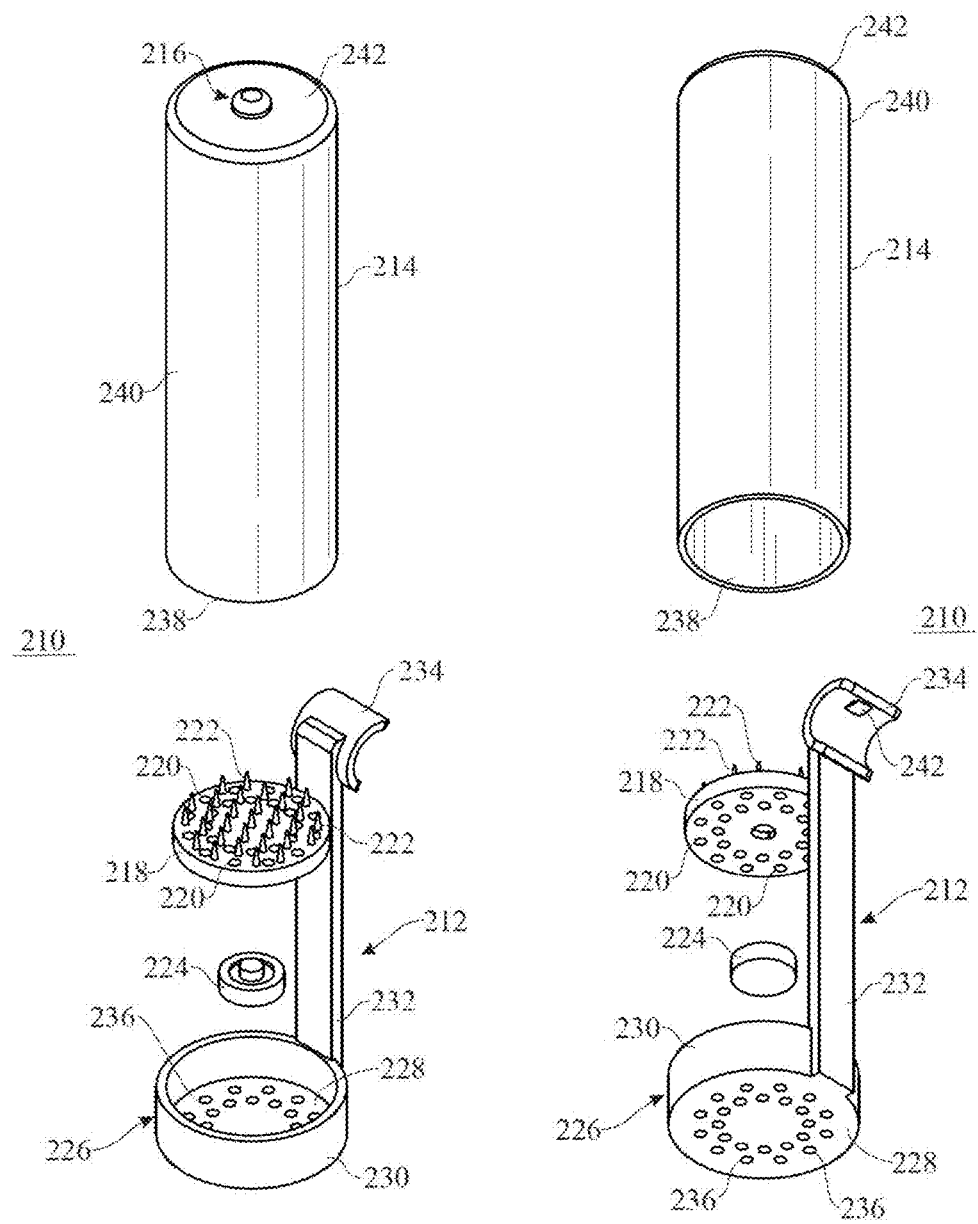
FIG. 6 presents a frontal perspective view, with parts separated, of an automatic spice dispenser where a sensor is placed on top of the spice dispenser.
FIG. 7 presents a rear perspective view, with parts separated, of the automatic spice dispenser of FIG. 6.

Referring now to FIGS. 6 and 7, there is an exemplary embodiment of a spice dispenser 210. Similar to the spice dispenser 110 described hereinabove, the spice dispenser 210 generally includes a holder 212, a cylindrical container 214 and a sensor 216 (FIG. 6). The spice dispenser additionally includes a grinder plate 218 having holes 220 and grinding teeth 222 and a motor 224 for rotating the grinder plate 218 within the cylindrical container 214. Particularly, in this second embodiment shown in FIGS. 6 and 7, a sensor 216 is disposed above the spice dispenser 210 such that a person's hand or other appropriate object can be sensed to dispense spices on a target object without the sensed object interfering with a trajectory of dispensed spices.

The holder 212 includes an end cap 226 having an end plate 228 and a cylindrical sidewall 230, a strap 232 and a support hook 234. The end plate 228 has apertures 236 for passage of spices. The cylindrical container 214 includes an open first end 238 positioned within the end cap 226 and a closed second end 240. In this embodiment, the sensor 216 is positioned at the top of the spice dispenser 210. Specifically, the sensor 216 is located on a top surface 242 of the closed second end 240 of the cylindrical container 214 (FIG. 6) and is activated by motion above the spice dispenser 210. Similar to that described hereinabove, the support hook 234 includes a contact pad 242 (FIG. 7) which is in electrical communication with the motor 224 and the sensor 216 to power the motor 224 in response to signals received from the sensor 216.

Figure 8:
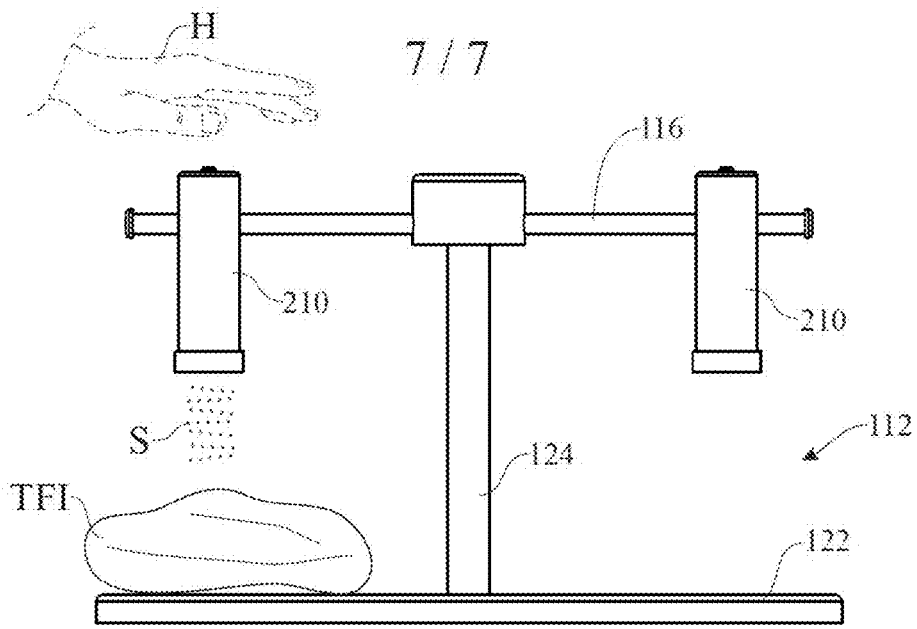
FIG. 8 presents a side view of the pair of automatic spice dispensers of FIG. 6 positioned on an elevated support stand.

As best shown in FIG. 8, the spice dispenser 210 is mounted on a support assembly, such as, for example, the support assembly 112 described hereinabove, by snapping the support hook 234 onto the support rod 116. As a hand "H" or other item is passed over the sensor 216, spices S are automatically ground and/or dispensed onto the TFI in a manner substantially similar to that described hereinabove. It is to be understood that in response to the sensor 216 detecting an object, spices may be both ground and dispensed or alternatively only dispensed. In some embodiments, the disclosed spice dispenser may include a mode for grinding spices in preparation for future dispensing. It is noted that the spice dispenser 210 may be utilized with other support assemblies as described herein (e.g., support assembly 300, etc.).

Figure 9:
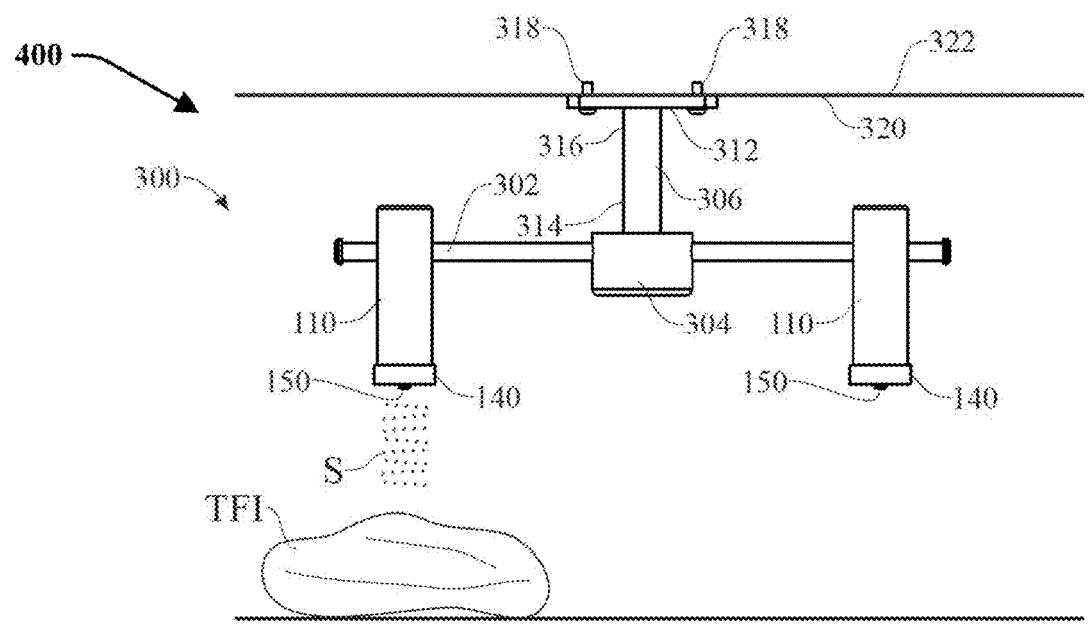
FIG. 9 presents a side view of the pair of automatic spice dispensers of FIG. 1 positioned on a supporting device including a hanger.

Referring now to FIG. 9, there is illustrated a spice dispensing assembly 400 that may generally comprise support assembly 300 for use with the disclosed spice dispensers, such as, for example, spice dispenser 110 having the sensor 150 located on the end cap 140. The support assembly 300 is designed to be suspended from an object and generally includes a support rod 302 for mounting the spice dispensers 110, a swivel mechanism 304 and a support shaft 306 extending upward from the swivel mechanism 304. The support rod 302 includes end buttons 308 and 310 to prevent the spice dispensers 110 from sliding off the support rod 302.

In this embodiment, the support assembly 300 additionally includes a mounting plate 312 to suspend the support assembly 300 from an object. A first end 314 of the support shaft 306 is mounted to the swivel mechanism 304 while a second end 316 of the support shaft 306 is affixed to the mounting plate 312. One or more fasteners, such as bolts 318 are provided to secure the mounting plate 312, and thus the support assembly 300 and attached spice dispensers 110, to a surface such as, for example, an underside 320 of a cabinet bottom 322. This allows the combined support assembly 300 and spice dispensers 110 to form an embodiment of a touch free spice dispensing assembly for use over counter tops. It is noted that the support assembly 300 may comprise various other configurations. For instance, the support assembly 300 may extend from a wall or generally vertical surface. In other examples, the support rod 302 may be suspended from wires or ropes.

In an exemplary use, the spice dispensing assembly 400 may be mounted to the underside 320 of the cabinet bottom 322 by use of the bolts 318 through the mounting plate 312. Thereafter, a TFI can be passed or positioned under the sensor 150 of the spice dispenser 110. The sensor 150 will activate the spice dispenser 110 to deposit spices S onto the TFI. It is noted that the mounting plate 312 may be positioned on a wall, door, or other surface. It is further noted that mounting plate 312 may be mounted via mechanisms other than bolts 318, such as magnets, VELCRO®, adhesives, or the like.

Figure 10:
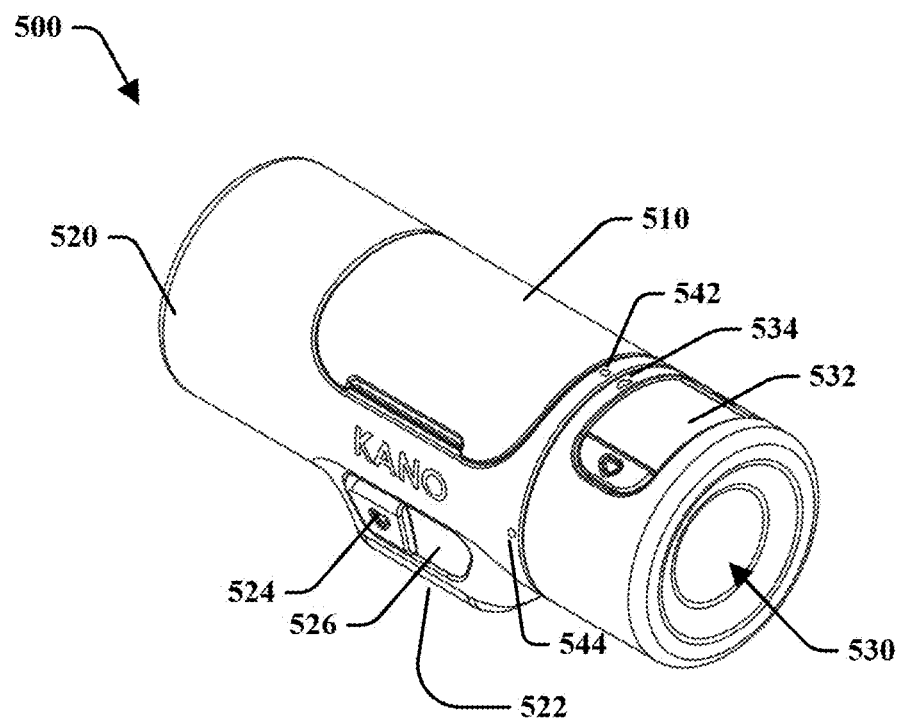
FIG. 10 presents a front perspective view showing a spice dispenser in a horizontal position in accordance with embodiments of the present disclosure.
Figure 11:
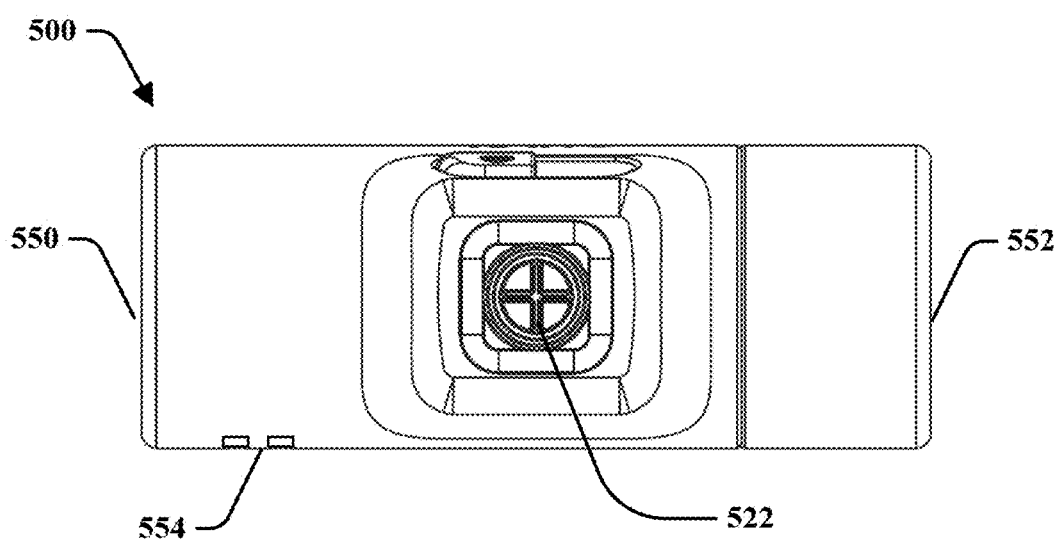
FIG. 11 presents a bottom view of the spice dispenser of FIG. 11 of the present disclosure.

Turning now to FIGS. 10-11, there is a spice dispenser 500 in accordance with various disclosed embodiments. It is noted that the spice dispenser 500 may primarily include a spice housing 510 (e.g., for storing spices) and a dispenser member 520 (e.g., for dispensing spices). It is noted that the spice dispenser 500 may be operatively connected to various disclosed supports disclosed herein. In another aspect, the spice dispenser 500 may be utilized as a stand-alone dispenser, or the like. It is further noted that the spice dispenser 500 may comprise similar or different aspects as the various other disclosed spice dispensers.

Figure 12:
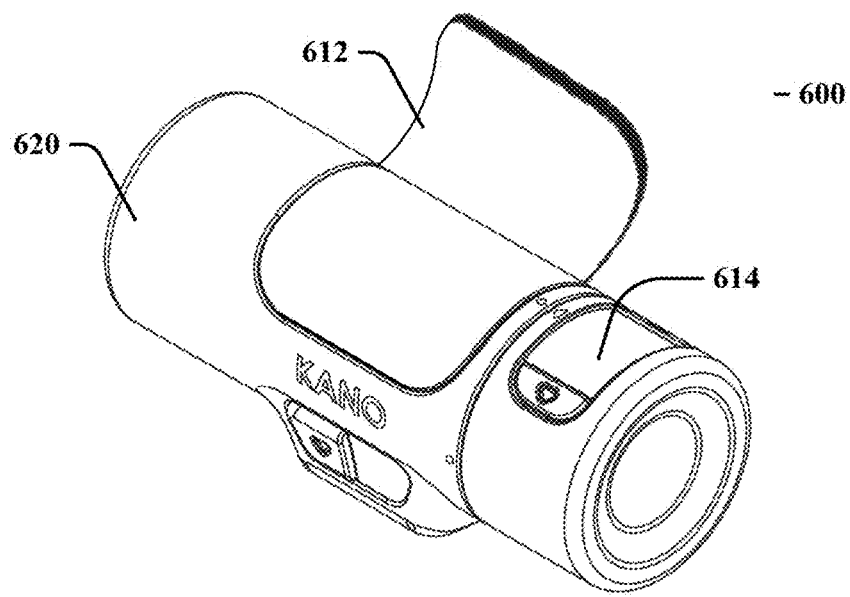
FIG. 12 presents a front perspective view showing a spice dispenser comprising a hatch in accordance with embodiments of the present disclosure.
Figure 13:
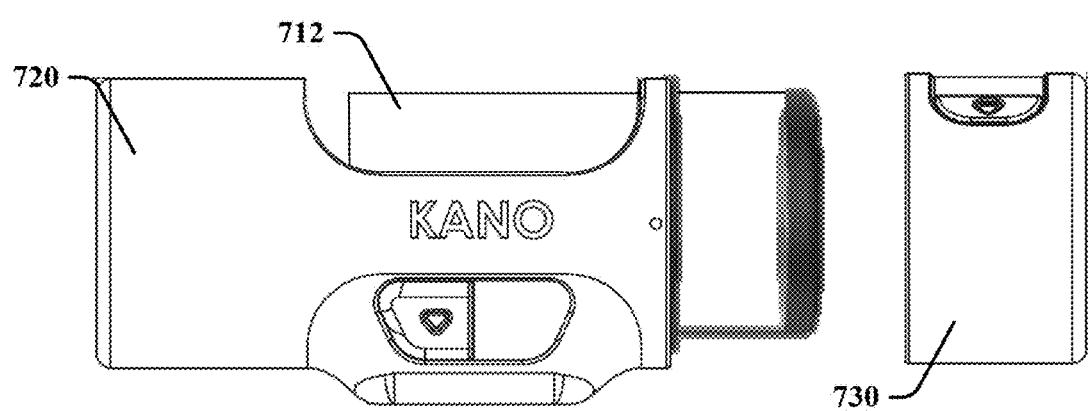
FIG. 13 presents a front exploded view showing a spice dispenser comprising a removable container in accordance with embodiments of the present disclosure.
Figure 14:
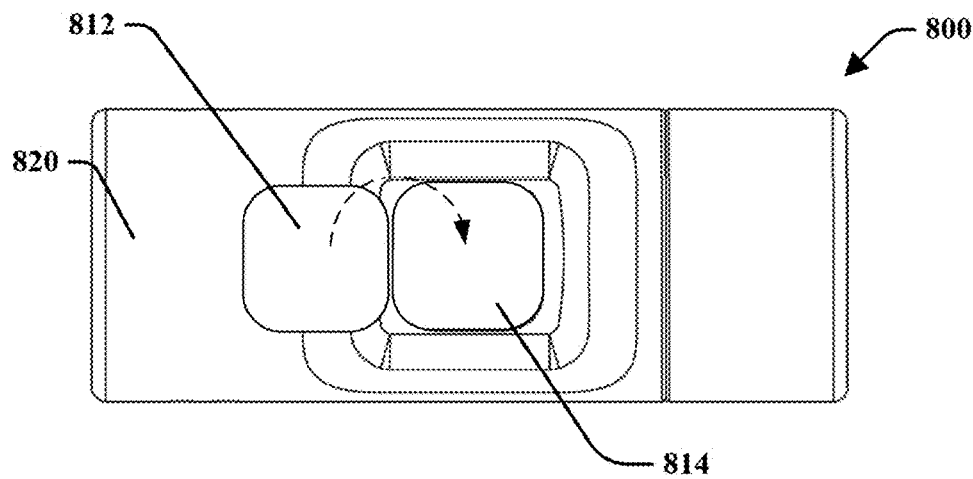
FIG. 14 presents a bottom view showing a spice dispenser comprising a different hatch in accordance with embodiments of the present disclosure.

Spice housing 510 may comprise a container made of a food grade material. The spice housing 510 may be unitarily formed with, coupled to (e.g., removably or irremovably), or otherwise assembled with the dispenser member 520. It is noted that the spice housing 510 may receive spice and/or provide spice via any desired mechanism. For instance, as shown in FIGS. 12-14 respectively, there are illustrated spice dispensers 600, 700, and 800. Each dispenser may generally operate with the various disclosed assemblies. Spice dispenser 600 may comprise a door 612 that may be operatively attached to a dispenser member 620. The door 612 may be removable, hingedly secured to, slideable, or otherwise coupled to the dispenser member 620. A user may move the door 612 to allow access to a spice cavity 614.

Spice dispenser 700, of FIG. 13, may comprise a removable container 712 that may be operatively attached to a dispenser member 720. The container 712 may be removably positioned within the dispenser member 720 and may be held in place by a removable cap 730. In another aspect, the container 712 may comprise one or more openings (not shown) that may allow spices to exit or enter the container 712. In an example, a user may remove the container 712 and place a different container (not shown) with other spices in the dispenser member 720. In another aspect, the container 712 may be disposable or replaceable.

Spice dispenser 800, as shown in FIG. 14, may include a plug 812 that may removably cover an aperture 814. The plug 812 may be removed so that a user may add, replace, or otherwise access spices within the spice dispenser 800. It is noted that the plug 812 may comprise an elastomeric material that may frictionally fit with the aperture 814. In another aspect, the plug 812 may comprise a spice grinder and/or motor (not shown). The plug 812 may be hingedly secured to a dispenser member 820 or other portion of the spice dispenser 800. It is noted that spice dispensers may include other means for accessing spices. For instance, a cap may be secured to the spice grinder via a screw top, fastener, magnet, or other mechanism. As such, this disclosure is not limited by way of such mechanisms.

Turning back to FIGS. 10 and 11, the dispenser member 520 may comprise a grinder 522 that may grind or otherwise dispense a spice, as described herein. The grinder 522 may be actuated by a manual button 524 and/or one or more sensors 526 as described here as well as elsewhere in this disclosure. The grinder 522 may expel or dispense the spice onto a target. It is noted that the grinder 522 may be disposed at various other locations, such as at a distal end 550 and/or proximal end 552. As such, the spice dispenser 500 may be configured for vertical or horizontal operation. It is further noted that the spice dispenser 500 may include a different number of grinders. In another aspect, the spice dispenser 500 may include a manual spice grinder or manual power mode that may allow a user to manually power the grinder.

The dispenser member 520 may include a cap member 530. The cap member 530 may comprise controller 532. The controller 532 may allow a user to select one or more parameters for dispensing of the spices. For instance, a user may select an amount of spice to dispense, a granularity of the spice, mode of operation (e.g., handheld use, sleep mode, support assembly mode) or the like. Controller 532 may comprise a digital display (e.g., LCD screen, touch screen, etc.) that may convey information, such as current settings. The user may interact with the controller 532 via one or more interfaces, such as buttons, touch screens, wireless communication (e.g., via a cellular phone), sensors, or the like.

In another aspect, the cap member 530 may be rotatable to allow for selection of one or more other parameters. For instance, an indicia 534 may indicate a selected parameter for operation of the spice dispenser 500. The cap member 530 may be rotated to another position. This may move the indicia 534 from aligning with indicia 542 to indicia 544. It is noted that a different number of indicia may be included. Moreover, such indicia may represent various different parameters for operation.

Spice grinder 500, according to various aspects, may include a power source disposed within the dispenser member 520. The power source may comprise disposable batteries and/or a rechargeable battery. For instance, the dispenser member 520 may include one or more contacts 554 that operatively interface with contacts of a support apparatus and/or a charging base. The contacts 554 may receive power and the power source may be charged for repeated use. It is noted that the dispenser member 520 may comprise other or different mechanisms to charge the power source, such as ports, outlets, solar panels, motion charging, or the like. Moreover, the spice grinder 500 may be additionally or alternatively powered by a base, a power mains, or the like.

Figure 15:
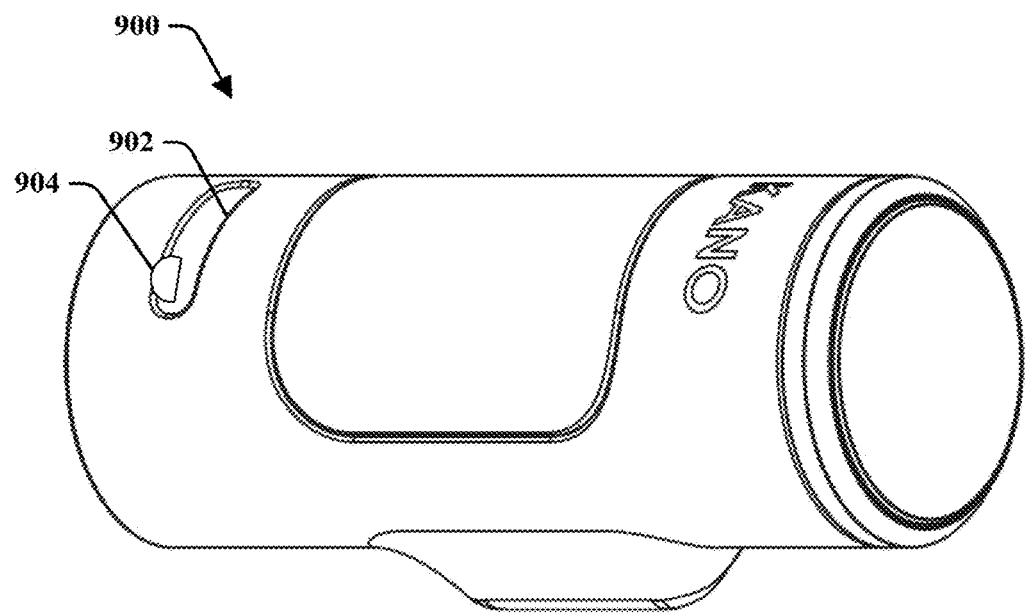
FIG. 15 presents a front perspective view showing a spice dispenser comprising a movable switch in accordance with embodiments of the present disclosure.

FIG. 15 illustrates an embodiment of a spice dispenser 900, in accordance with various disclosed aspects. It is noted that the spice dispenser 900 may include various features or aspects as disclosed with reference to the various other drawings. Spice dispenser 900 may include an analog or manual control 902 that may include switch 904. A user may interact with the switch to select an operating parameter (e.g., mode of operation, granularity, etc.) for the spice dispenser 900. The switch 904 may be positioned at various different locations. Each location may signify a selection of a parameter. It is noted that various other manual controls 902 may be utilized. Moreover, the spice dispenser 900 may include additional or different manual controls.

Figure 16:
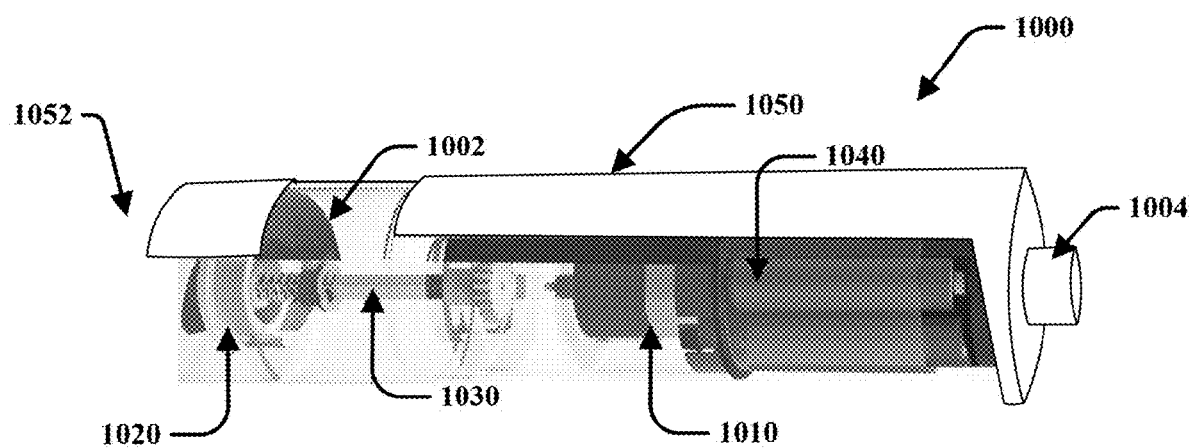
FIG. 16 presents a front cross-sectional view showing a spice dispenser in accordance with embodiments of the present disclosure.

FIG. 16 illustrates a partial cross-sectional view of a spice grinder 1000, in accordance with various disclosed aspects. The spice grinder 1000 may include a motor 1010 that drives a grinder 1020 via a drive shaft 1030. The motor 1010 may be actuated by a sensor 1004. In another aspect, the motor 1010 may be powered by a power source 1040. As described herein, the power source 1040 may comprise a battery. The drive shaft 1030 may pass through a spice housing or container 1002. It is noted that the spice grinder 1000 may comprise various other configurations in accordance with the various disclosed embodiments. For instance, the motor 1010 may be disposed proximal the grinder 1020. In another aspect, the grinder 1020 may be disposed along an elongated or horizontal side 1050 rather than the end 1052.

Figure 17:
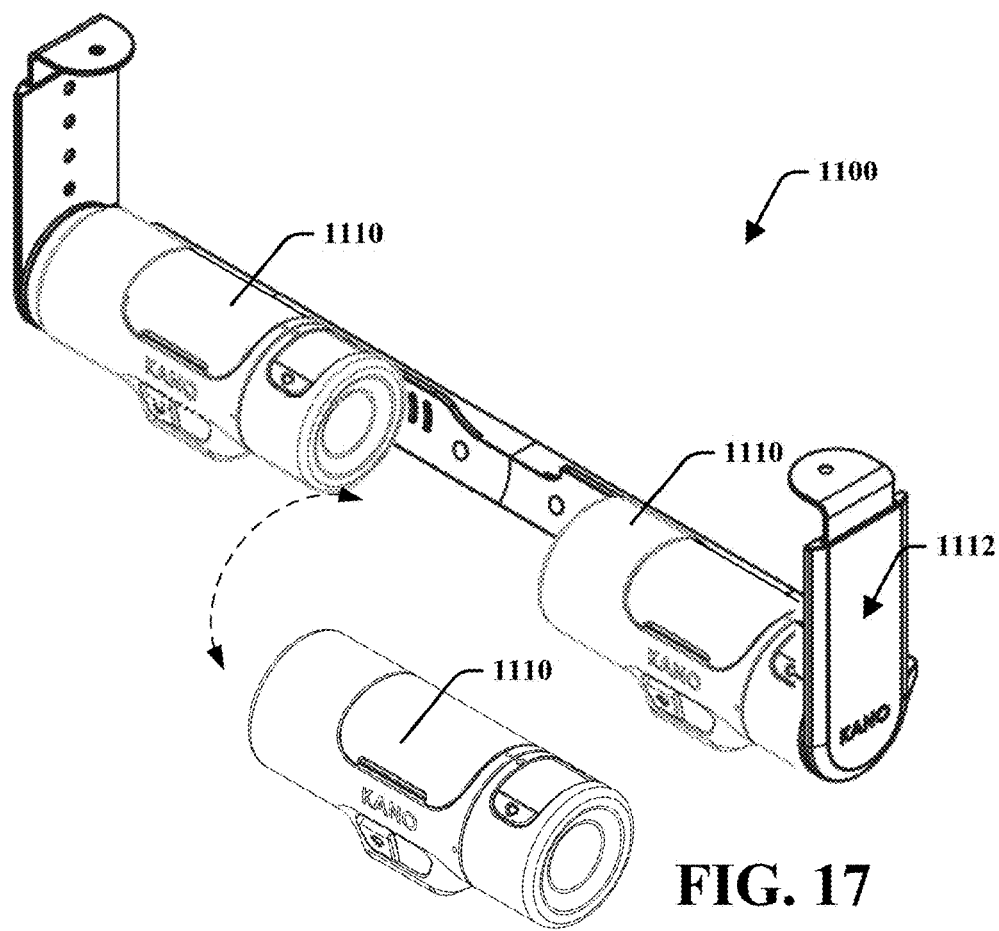
FIG. 17 presents a front perspective view showing a spice dispensing assembly comprising a support assembly and removable spice dispensers in accordance with embodiments of the present disclosure.
Figure 18:
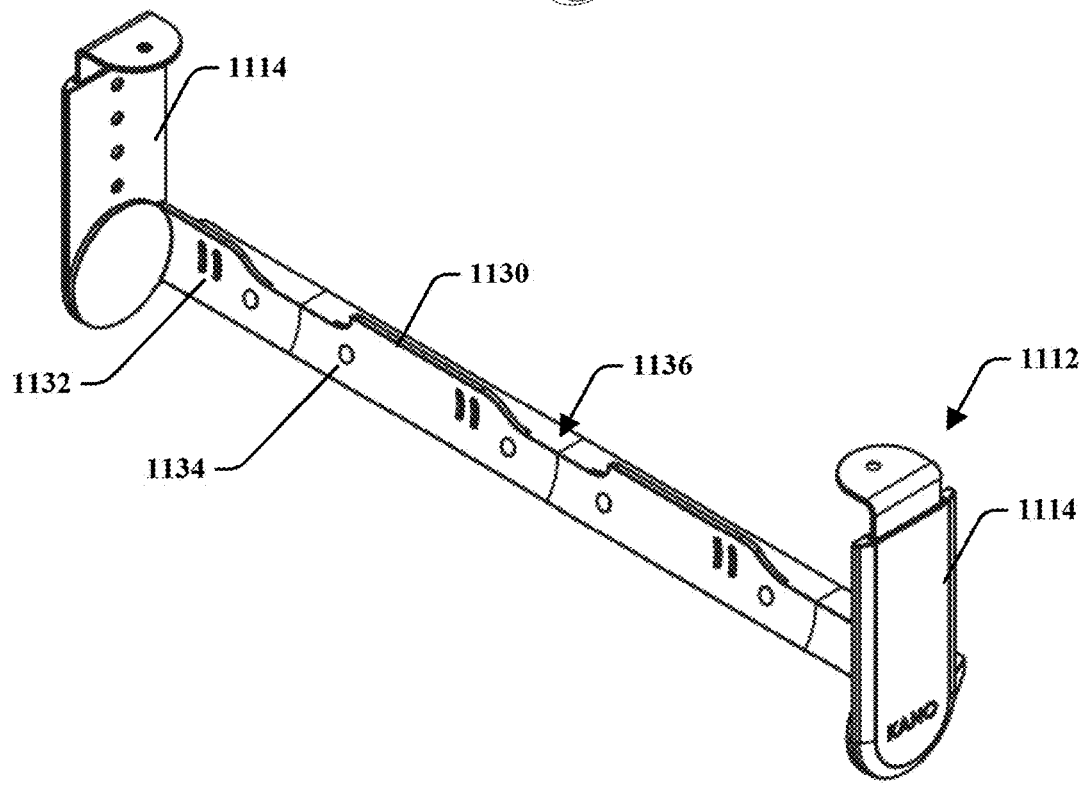
FIG. 18 presents a front perspective view of the support assembly of FIG. 17 in accordance with embodiments of the present disclosure.

Turning now to FIGS. 17 and 18, there is a spice dispensing assembly 1100. The spice dispensing assembly 1100 may primarily include a support assembly 1112 and one or more spice dispensers 1110. The support assembly 1112 may be operatively mounted to a wall, cabinet, ceiling, or other surface. In an aspect, the support assembly 1112 may support the one or more spice dispensers 1110 above a surface.

Support assembly 1112 may comprise one or more mounting arms 1114 that may be attached to a surface to mount the support assembly 1112. A support rail 1130 may extend from the mounting arms 1114. It is noted that the mounting arms 1114 may be adjustable such that the support rail 1130 may be disposed and/or moved to a desired position.

The mounting arms 1114 may also prevent the spice dispensers 1110 from being accidently pushed off of the support rail 1130. In this aspect, the mounting arms 1114 may serve as end caps for the support rail 1130.

Figure 19:
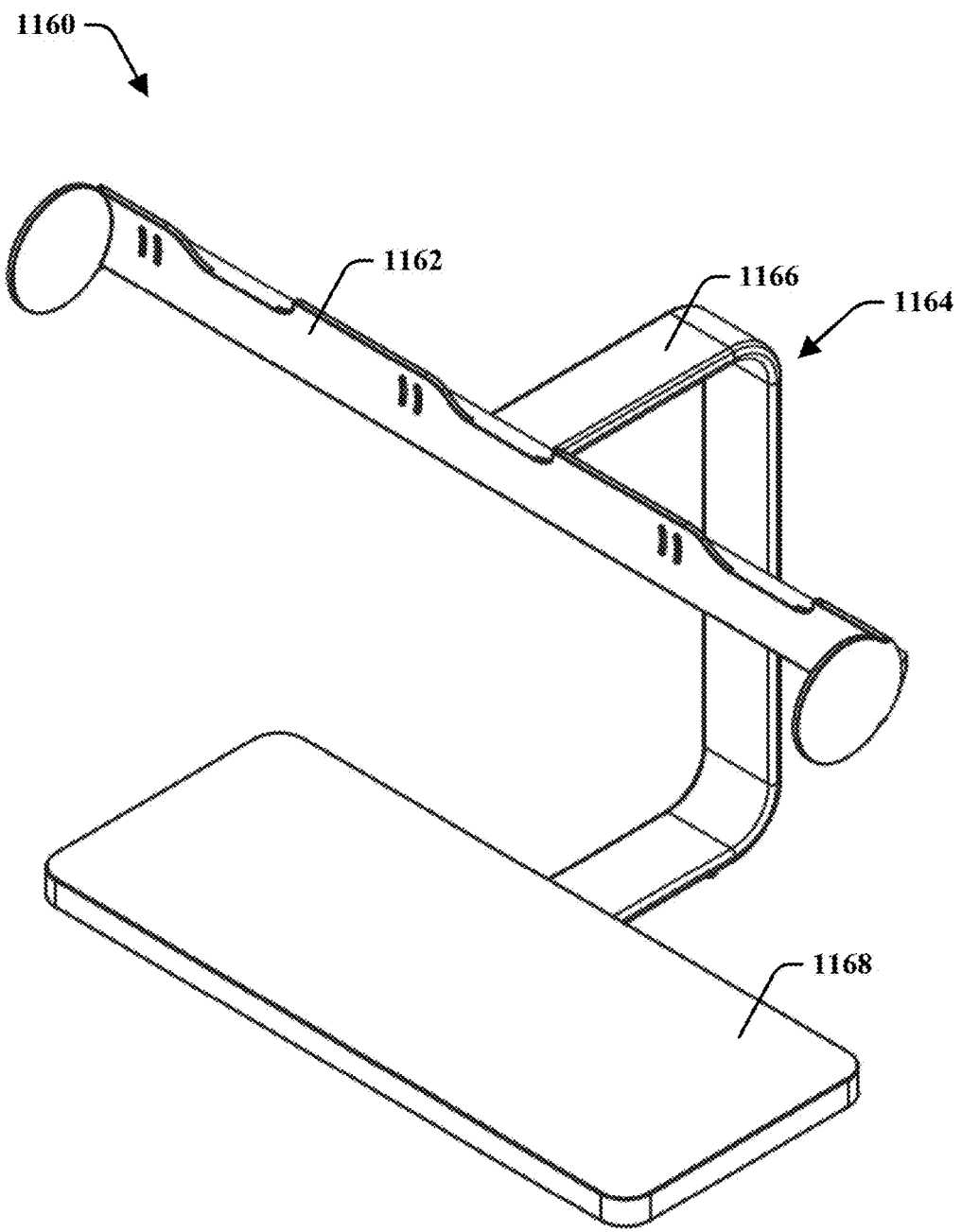
FIG. 19 presents a front perspective view showing a support assembly with a support rail and foot in accordance with embodiments of the present disclosure.

It is further noted that various other support mechanisms may be utilized. For instance, support assembly 1160 of FIG. 19 may support spice dispensers 1110 according to various disclosed aspects. Moreover, support assembly 1160 may comprise similar aspects as those of support assembly 1112. As an example, support assembly 1160 may include a support rod 1162 that may comprise similar aspects as a support rail 1130 of support assembly 1112. In another aspect, support assembly 1160 may comprise a base 1164 that may include a support arm 1166 and a foot 1168. The base 1164 may support the support rail 1162. It is noted that the support assembly 1160 may comprise other components, such as a non-slip pad, a power cord (e.g., which may plug into a power outlet), or the like.

Support rail 1130 may include one or more charging ports or contacts 1132. The contacts 1132 may operatively interface with contacts of the spice dispensers 1110 (e.g., contacts 554 of FIG. 11). This may allow contacts 1132 to provide power to the spice dispensers 1110 to power a motor and/or charge a power supply of the spice dispensers 1110. As described herein, various other charging or power supplying mechanisms may be utilized, such as capacitive charging or the like. Moreover, support rail 1130 may include a power cord that may be plugged into a power source (e.g., a wall outlet).

In various embodiments, support rail 1130 may include attachment members 120 for support of the spice dispensers 1110. The attachment members 1120 may include magnets that operatively attract magnets of the spice dispensers 1110. It is noted, that various other attachment mechanisms may be utilized as described in this disclosure. For instance, one or more straps, fasteners, hooks, claps, or the like may be utilized to hold the spice dispensers 1110. It is further noted that the spice dispensers 1110 may be affixed (e.g., irremovably or removably) to the support rail 1130. Moreover, support rail 1130 may include one or more finger cutouts 1136. The finger cutouts 1136 may allow a user to grasp and remove a desired spice dispenser 1110. While three spice dispensers 1110 are shown, it is noted that the support rail 1130 may support any number of spice dispensers 1110. Moreover, the spice dispensing assembly 1100 may include any number of support arms 1114.

As an illustrative example, each of the spice dispensers 1110 may store a particular spice. A user may select an appropriate spice and spice dispenser 1110. The user may place food or a container under the selected spice dispenser 1110, and may activate the selected spice dispenser 1110 via one or more sensors. The spice dispenser 1110 may dispense the spice without the user ever having to touch the dispenser. This may reduce the possibility of cross-contamination. For instance, a user may be preparing raw meat. While handling the meat, the user may need to add spices to the meat. With traditional spice dispensers, the user is required to physically hold and operate the spice dispenser. If a user does not wash it's hands, the user may contaminate the spice dispenser. The contamination may spread to other objects and may cause illness. If the user does wash it's hands, preparation time will increase. The disclosed systems may reduce or remove the need to physically touch the spice dispensers 1110 and/or may increase efficiency in preparation. For instance, the user may dispense spices from spice dispensers 1110 without ever having to touch the spice dispensers. This, as well as other aspects of this disclosure, may reduce or prevent contamination and/or may reduce time needed in food preparation.

In another example, the user may wish to remove one or more of the spice dispensers 1110. For instance, the user may wish to place salt and/or pepper on a table so that the user or others can add the salt or pepper to their food. Various disclosed embodiments may allow the user to remove the spice dispensers 1110 by simply grasping them. The user may then place the spice dispensers 1110 in a desired location. As described herein, the user may also switch the mode of operation to a "table mode" from a regular or mounted mode. This table mode may comprise different activation triggers that prevent accidental discharge of spices. It is further noted that removal and/or placement of the spice dispensers 1110 on the support rod 1130 may automatically switch the operating modes.

Figure 20:
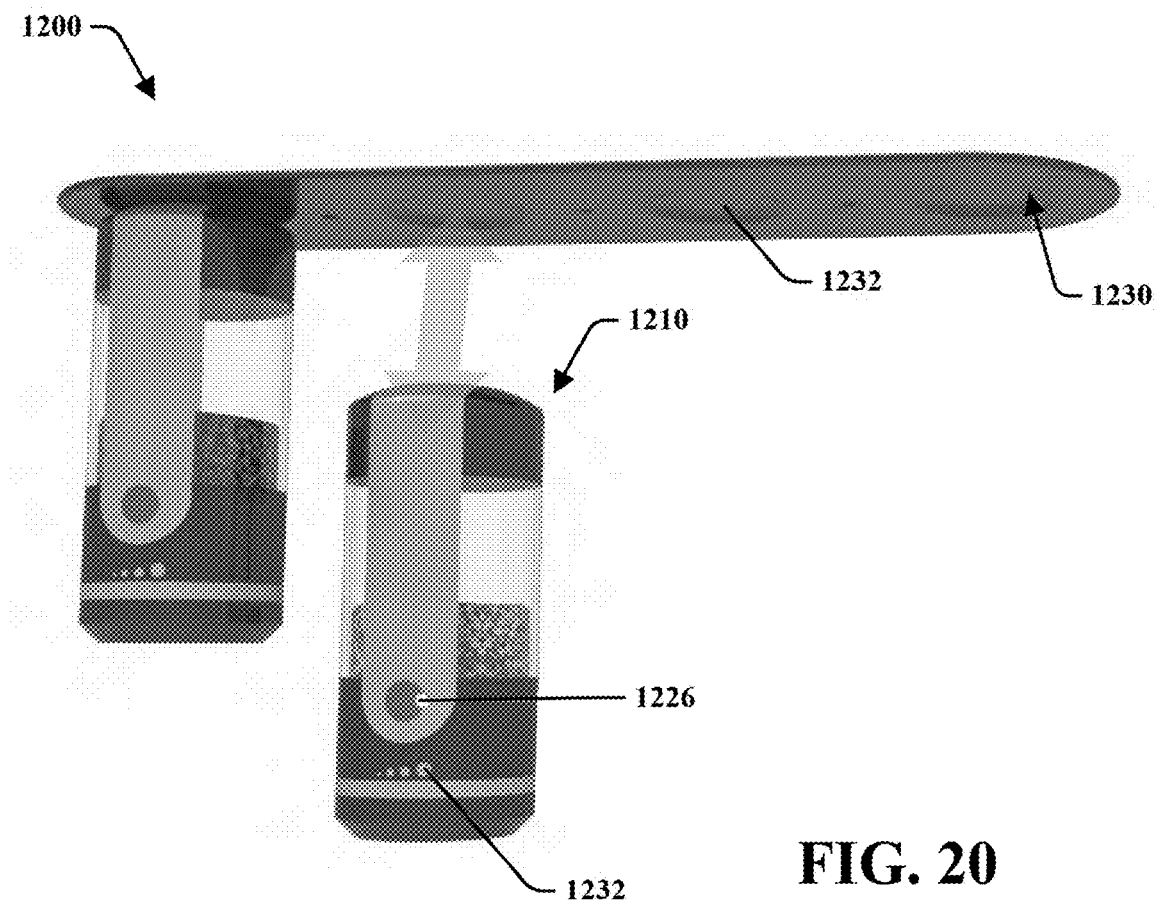
FIG. 20 presents a front perspective view showing a low-profile spice dispensing assembly comprising a support assembly that may receive removable spice dispensers in accordance with embodiments of the present disclosure.
Figure 21:
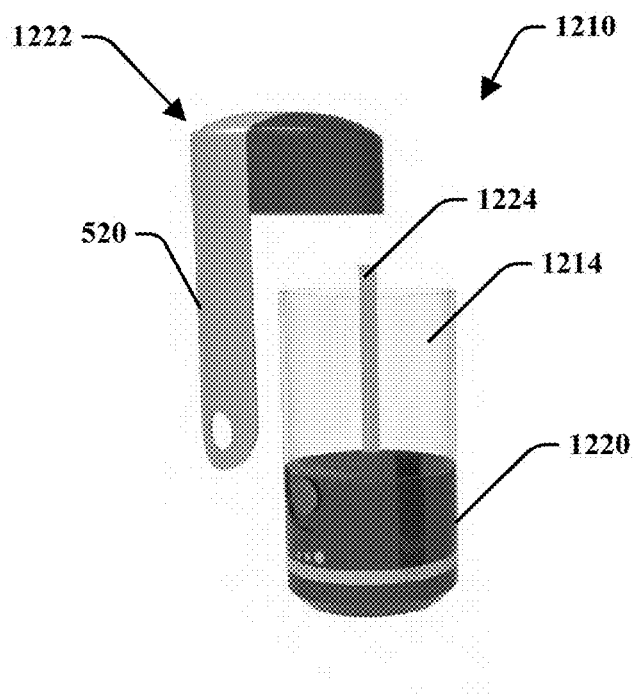
FIG. 21 presents a front perspective view showing a spice dispenser of FIG. 20 with a removable cap in accordance with embodiments of the present disclosure.

Referring now to FIGS. 20-21, there is a spice dispensing assembly 1200 according to various disclosed embodiments. As noted herein, the spice dispensing assembly 1200 may include similar aspects as described with reference to the various other figures. Spice dispensing assembly 1100 may primarily include a support rail 1230 and one or more spice dispensers 1210. The spice dispensers 1210 may be operatively mounted to the support rail 1230 via one or more magnet support areas 1232 within the support rail 1230 and one or more magnets 1212 of the spice dispensers 1210. The magnet support areas 1232 may include a well or relieved area that may allow for alignment of the spice dispensers 1210. It is noted that the spice dispensers 1210 may be mounted to the support rail 1230 via various other mechanisms as described herein.

The spice dispensers 1210 may generally comprise a container 1214 that may house spices, a dispenser member 1220, and a cap 1222. A motor may be disposed within the dispenser member 1220 and/or cap 1222. The motor may drive the drive shaft 1224 to rotate a grinder or dispenser within the dispenser member 1220. In an aspect, the motor may be actuated by a sensor 1226 (e.g., motion sensor, audio sensor, heat sensor, etc.). The cap 1222 may include an attachment member 1228 that may secure the cap 1220 with the various other components of the spice dispenser 1210.

It is noted that the spice dispenser 1210 may comprise a power source as described with reference to the various disclosed embodiments. Moreover, the support rail 1230 may provide power that may recharge the power source of the spice dispenser 1210. It is further noted that the spice dispenser 1210 may include a granularity control mechanism 1232. This may allow a user to select a granularity. In an aspect, the granularity control mechanism 1232 may be manually adjusted by physical rotation or the like. In another aspect, the granularity control mechanism 1232 may be adjusted by a touch sensor or other sensor.

Figure 22:
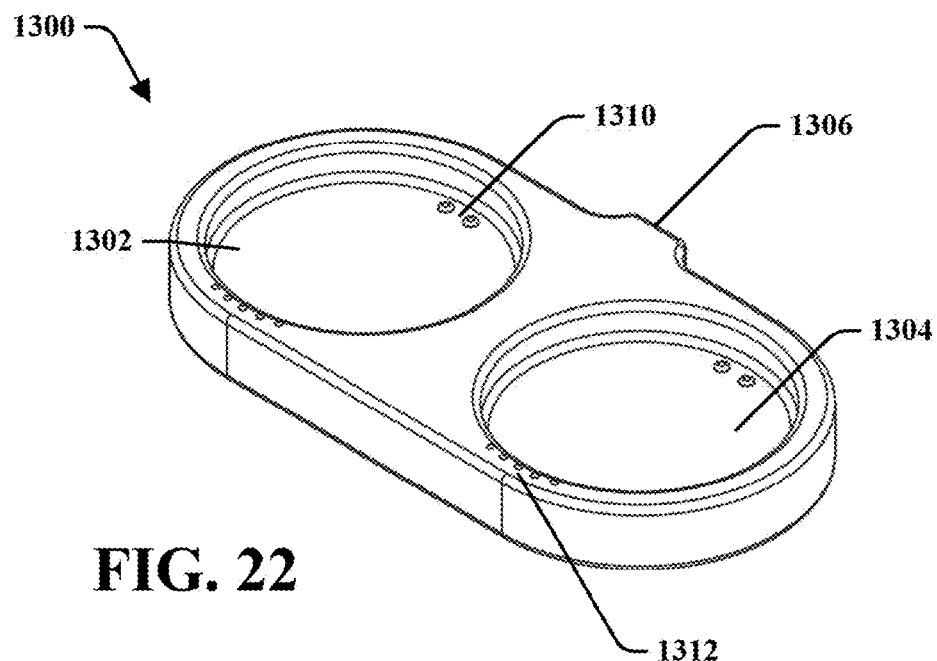
FIG. 22 presents a front perspective view showing a docking station that operatively charges multiple spice dispensers in accordance with embodiments of the present disclosure.
Figure 23:
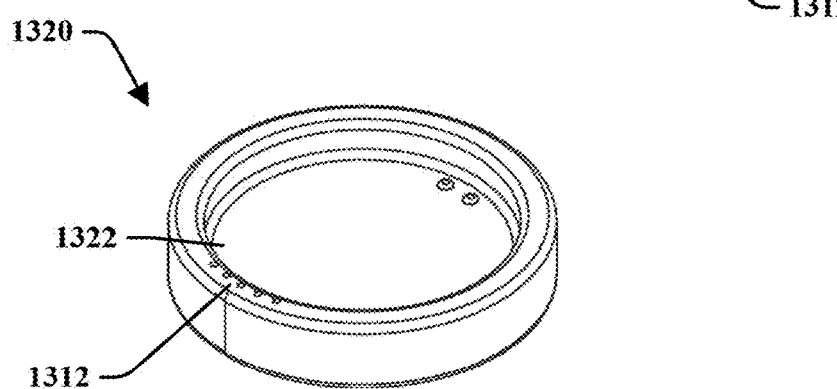
FIG. 23 presents a front perspective view showing a docking station that operatively charges one spice dispenser at a given time in accordance with embodiments of the present disclosure.
Figure 24:
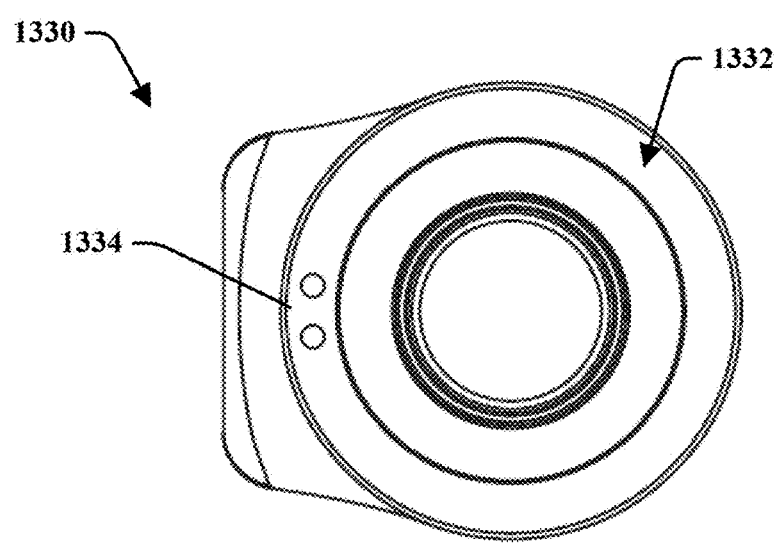
FIG. 24 presents a bottom view showing a rechargeable spice dispenser in accordance with embodiments of the present disclosure.

Turning to FIGS. 22-23, there depicted are charging base 1300 and charging base 1320 that may charge a spice dispenser 1330 in accordance with various disclosed embodiments. The charging base 1300 may charge multiple spice dispensers 1330 simultaneously, whereas the charging base 1320 operatively charges one spice dispenser 1330 at a time. It is noted, however, that the charging bases 1300 and 1320 may comprise similar aspects or functionality unless otherwise stated. For instance, charging base 1300 may comprise multiple holders 1302 and 1304 that operatively receive spice dispensers 1330, whereas charging base 1320 comprises a single holder 1322. It is noted that the charging base 1300 may comprise any number of holders.

Each holder 1302, 1304, and 1322 may comprise contacts 1310. The contacts 1310 may operatively interface with contacts 1334 disposed on a side 1332 of spice dispenser 1330. As described herein, the contacts 1310 may provide power to the spice dispenser 1330 via the contacts 1310 and 1334. It is noted that various other mechanisms may provide power to the spice dispenser 1330, in accordance with the various disclosed embodiments. Moreover, spice dispenser 1330 may comprise similar components or aspects as the various other spice dispensers described herein.

The charging bases 1300 and 1320 may each include one or more indicators 1312. The indicators 1312 may comprise lights (e.g., LEDs, etc.) or other components that may indicate whether a spice dispenser 1330 is charging, has completed charging, a level of charge, or the like. Moreover, the indicators 1312 may indicate other information, such as troubleshooting codes. It is further noted that the charging bases 1300 and 1320 may include power ports 1306 that may receive power from a power source, such as a wall outlet. It is noted that the power port 1306 may include a cord or the like. It is noted that the cord may be removably attached to the charging bases 1300 and 1320. In an example, the charging bases 1300 and 1320 may be placed on a table, counter, or other surface. A user may easily grasp and use the spice dispenser 1330 as desired.

Figure 25:
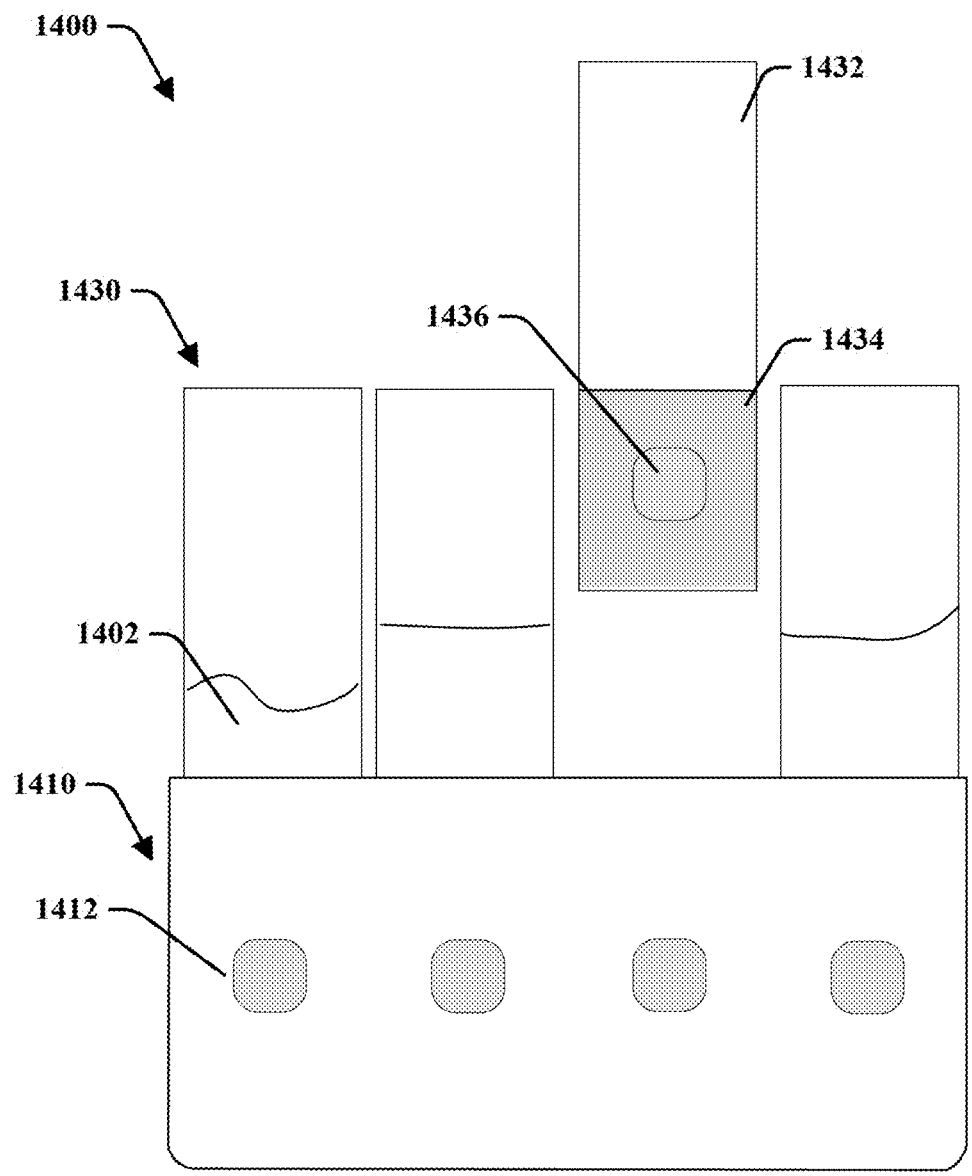
FIG. 25 presents a front perspective view showing a spice dispensing assembly comprising a support assembly that may receive generally rectangular spice dispensers in accordance with embodiments of the present disclosure.

FIG. 25 is a spice dispensing assembly 1400 that may include support assembly 1410 and one or more spice dispensers 1430. Spice dispensers 1430 may be generally rectangular and may include a container 1432 and a dispensing member 1434. The dispensing member 1434 may include a sensor 1436. It is noted that the spice dispensers 1430 may comprise different shapes and configurations. Moreover, the spice dispensers 1430 may comprise similar aspects as the various other described spice dispensers of this disclosure. It is noted that a user may operatively remove the spice dispensers 1430 to refill spices 1402 and/or use the spice dispenser 1430 by hand.

Support assembly 1410 may support the spice dispensers 1430. For instance, the support assembly 1410 may receive or cradle the spice dispensers 1430. The support assembly 1410 may include one or more windows or apertures 1412 that may allow sensors 1436 to be exposed when the spice dispensers 1430 are supported by the support assembly 1410. As described herein, the support assembly 1410—as well as other disclosed support assemblies—may be mounted on a surface (e.g., wall, cabinet, pantry, etc.), supported by a stand that is placed on a table or counter, and/or may be otherwise suspended above a desired location (e.g., suspended from a ceiling/wall mounted pot rack).

Figure 26:
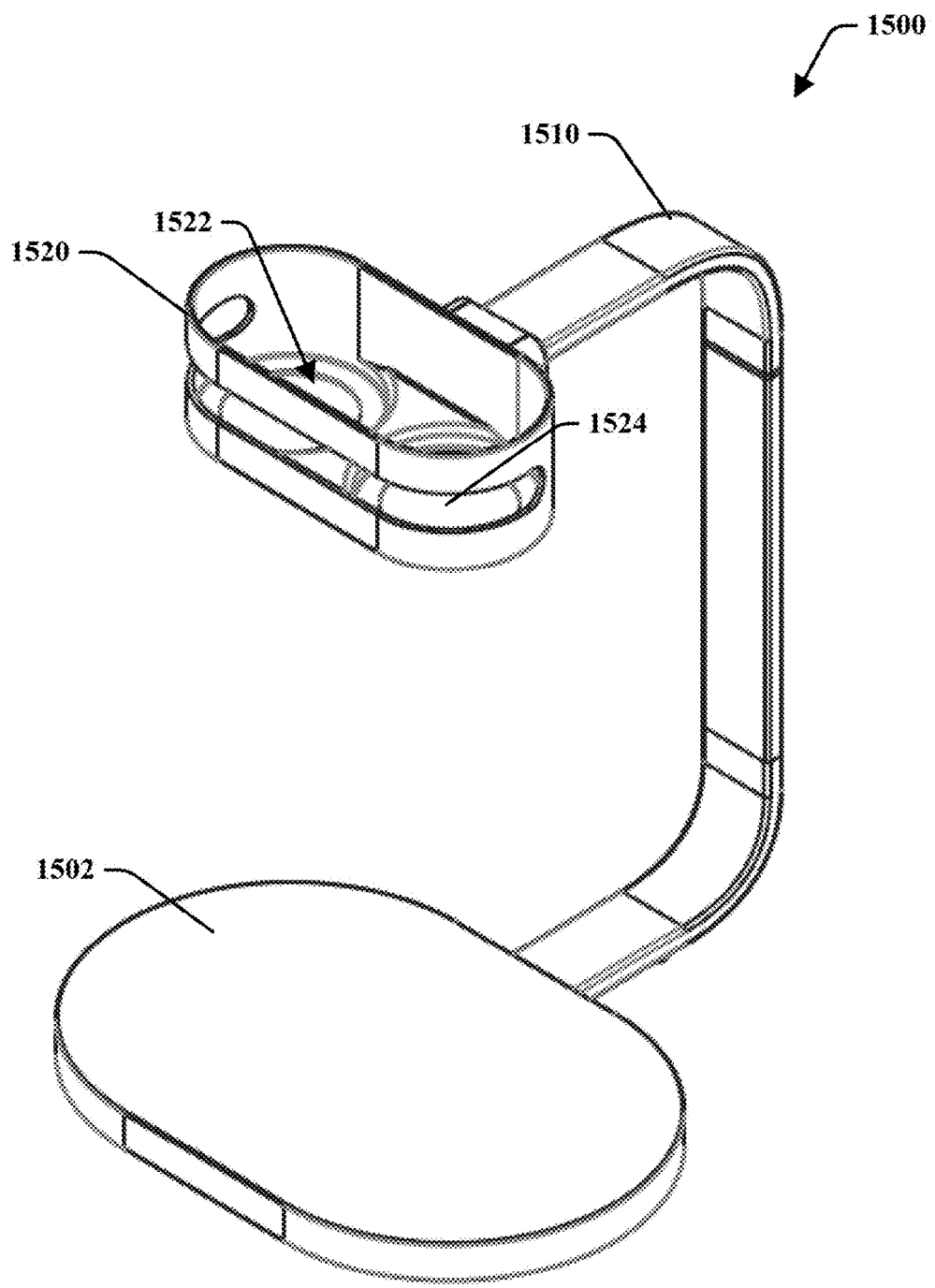
FIG. 26 presents a front perspective view showing a support assembly that operatively supports spice dispensers in an elevated position in accordance with embodiments of the present disclosure.

Turning to FIG. 26, there is a support assembly 1500 that may receive or support various spice dispensers described in this disclosure. The support assembly 1500 may comprise a foot 1502, a support arm 1510, and a cradle 1520. The cradle 1520 operatively receives a spice dispenser and may allow for hands-free dispensing of spices. In an aspect, the cradle 1520 may comprise one or more apertures 1522 that may allow a spice dispenser and/or spices to pass therethrough. For instance, the apertures 1522 may allow a spice dispenser to hang or be otherwise suspended through the apertures 1522. In another aspect, spice dispensers may be supported above the apertures such that spices pass through the apertures 1522 when they are dispensed. It is further noted that the cradle 1520 may include sensor apertures 1524 that may allow for exposure of sensors of spice dispensers when the spice dispensers are supported by the cradle 1520.

FIGS. 27a-b illustrate spice dispensers 1600 and 1620 that may be suspended and/or hang from a support assembly, such as support assembly 1500 of FIG. 26 and/or support assembly 1630 of FIG. 28. The spice dispensers 1600 and 1620 may comprise similar aspects or components. For instance, the spice dispensers may comprise gripping portion 1602, dispensing portion 1604, and cap 1610. The gripping portion 1602 may include an ergonomic configuration. In another aspect, gripping portion 1602 may house spices that may be viewable via a window 1608. The window 1608 may allow a user to identify the kind of spice and/or level of spice. Cap 1610 may be removably connected to the gripping portion 1602. In another aspect, the cap 1610 may comprise a ledge 1612. The ledge 1612 may allow the spice dispensers 1600/1620 to be supported by support assembly 1500, support assembly 1630, or various other support assemblies.

In another aspect, spice dispensers 1600/1620 may include one or more lights, such as LED 1614. The LED 1614 may emit light when a user presses an actuator (not shown), when a sensor 1618 triggers a response (e.g., when a sensor 1618 causes dispensing of a spice), or upon occurrence of another triggering event. In another aspect, a user may utilize the LED 1614 as an under-cabinet light.

Figure 29:
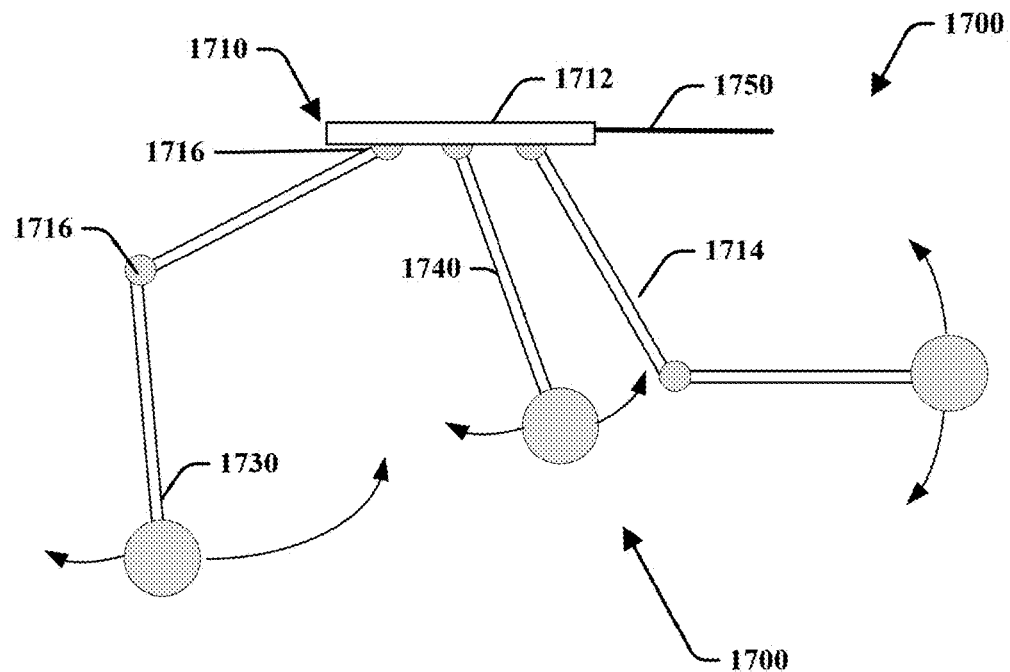
FIG. 29 presents a top perspective view of an articulating spice dispensing assembly in accordance with embodiments of the present disclosure.
Figure 30:
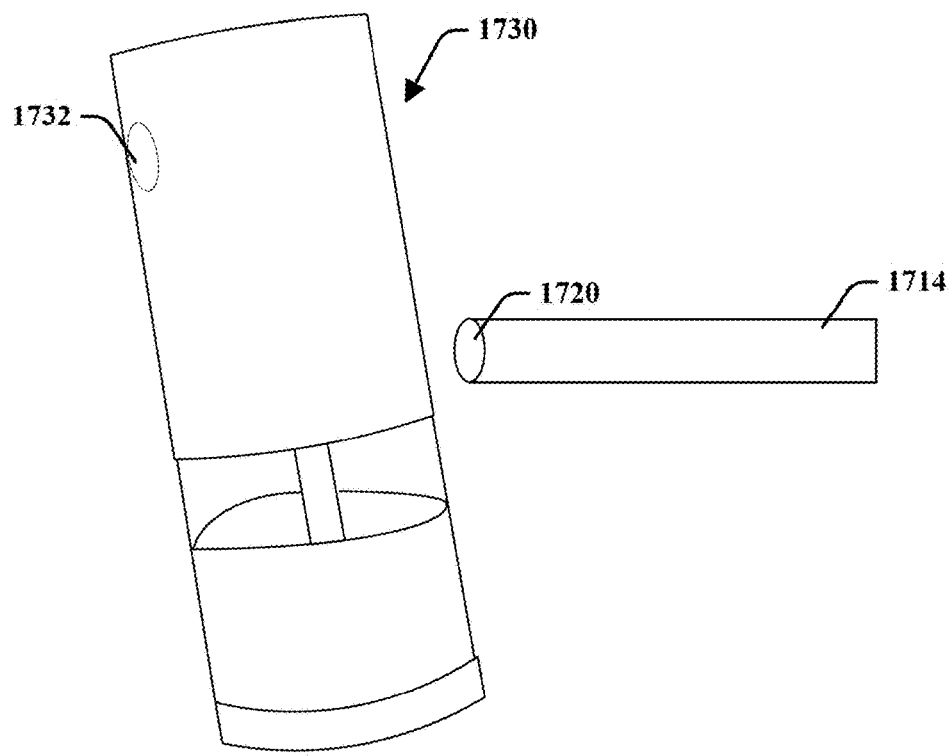
FIG. 30 presents an enlarged view of the articulating spice dispensing assembly of FIG. 29 in accordance with embodiments of the present disclosure.

FIGS. 29-30 depict an articulating spice dispensing assembly 1700 that may comprise a support assembly 1710 that operatively supports one or more spice dispensers 1730.

The support assembly 1710 may include a base 1712 and one or more articulating arms 1714 extending from the base 1712. In an aspect, the base 1712 may be operatively mounted on a wall, cabinet, or other surface. It is further noted that the base 1712 may comprise other configurations. For example, the base 1712 may comprise a foot and arm, such that the base may rest on a counter top.

The arms 1714 may comprise one or more points of articulation (e.g., 1716 and 1718) that may allow a user to articulate the arms 1714 and position a spice dispenser 1730. It is noted that the arms 1714 may comprise different numbers of points of articulation, and may be of various lengths. In another aspect, the arms 1714 may be telescoping such that they may extend different distances from the base 1712.

The arms 1714 may attach to the spice dispensers 1730 at a distal end 1720. In an aspect, the distal end 1720 may be inserted into an aperture (not shown) of the spice dispenser 1730. The distal end 1720 and the spice dispenser 1730 may be attached or coupled via magnets, fasteners, threaded members, or the like. It is further noted that the distal end 1720 may comprise an electrical contact or other mechanism that may transfer power to the spice dispenser 1730. For example, power may be supplied to the base 1712 via a wired connection 1750. The power may then be transferred to the spice dispenser 1730 through the arms 1714. The power may allow a motor or dispenser to operate upon activation. Activation may occur in response to a sensor 1732 sensing motion or other activity.

Figure 31:
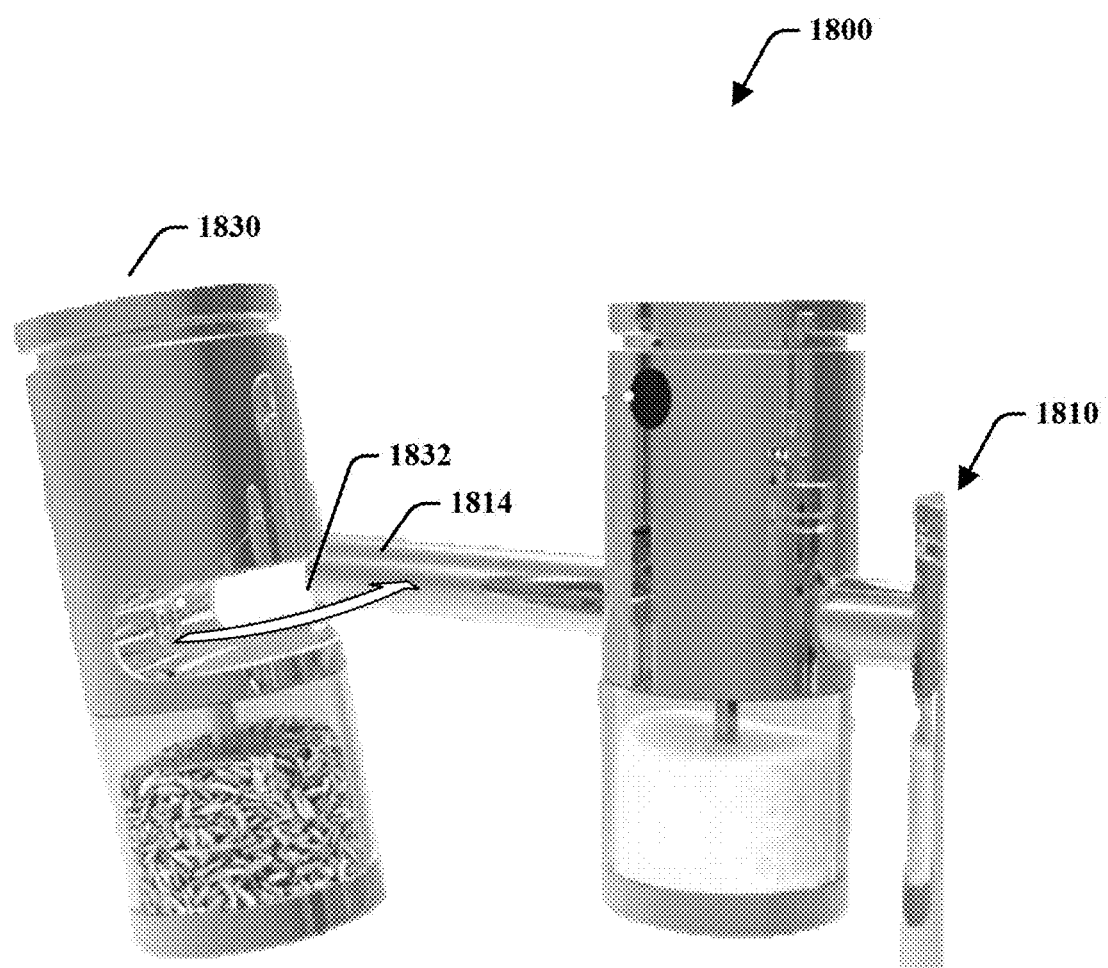
FIG. 31 presents a front perspective view of a spice dispensing assembly comprising mountable and rechargeable spice dispensers in accordance with embodiments of the present disclosure.

FIG. 31 depicts another spice assembly 1800 that may comprise a support assembly 1810 that operatively supports one or more spice dispensers 1830. The spice dispensing assembly 1800 may be similar to the spice dispensing assembly 1700 and/or may comprise other aspects as described here. As depicted, the spice dispensers 1830 may comprise channels 1832 that operatively receive an arm 1814 extending from a base. It is noted that the spice dispensers 1830 may be secured to the arm 1814 in accordance with various disclosed aspects.

Figure 32:
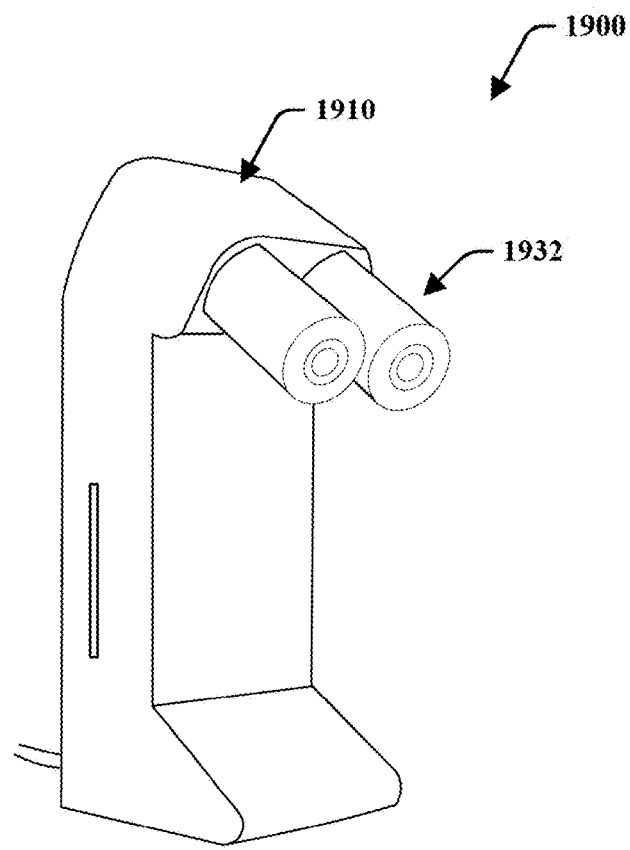
FIG. 32 presents a front perspective view showing a spice dispensing assembly comprising a support and a storage compartment in accordance with embodiments of the present disclosure.
Figure 33:
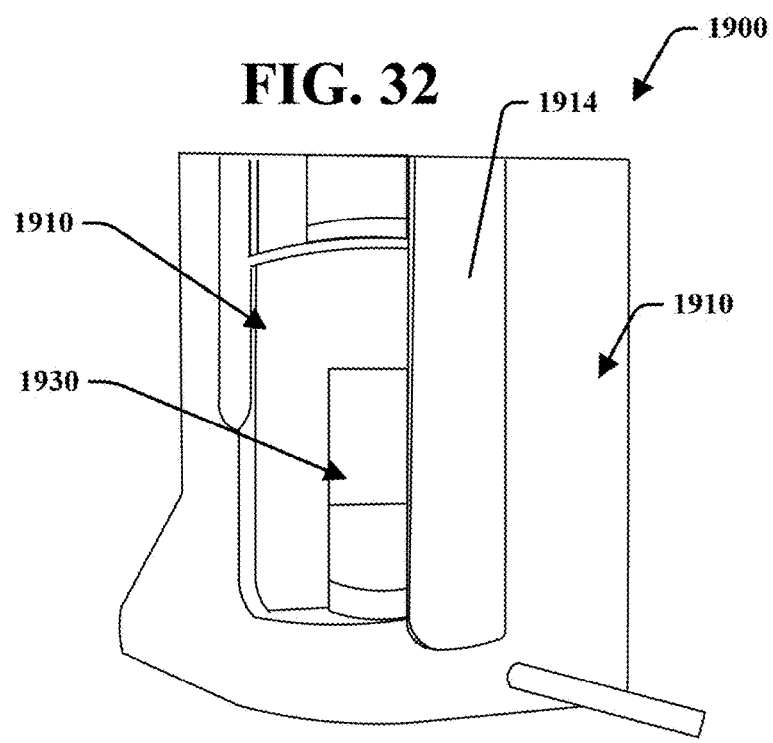
FIG. 33 presents a back perspective view of the spice dispensing assembly of FIG. 32 with a door open to the storage compartment in accordance with embodiments of the present disclosure.

FIGS. 32 and 33 depict a dispensing spice dispensing assembly 1900 that may include a support assembly 1910 that operatively stores one or more containers 1930 in a housing 1912. The containers 1930 may be selectively attached with a dispensing mechanism 1932. In another aspect, a user may access stored containers 1930 via a door or hatch 1914. It is noted that the containers 1930 may be attached to the dispensing mechanism 1932 via various mechanisms as described in this disclosure.

Figure 34:
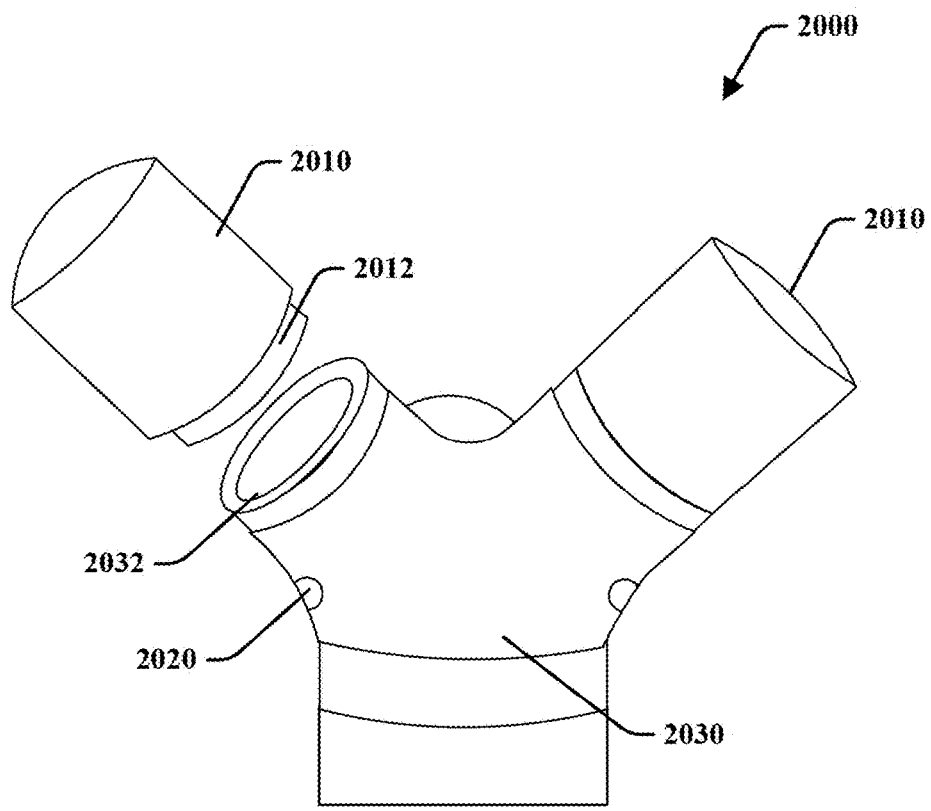
FIG. 34 presents a front perspective view showing a spice dispensing assembly comprising a multiple container support in accordance with embodiments of the present disclosure.
Figure 35:
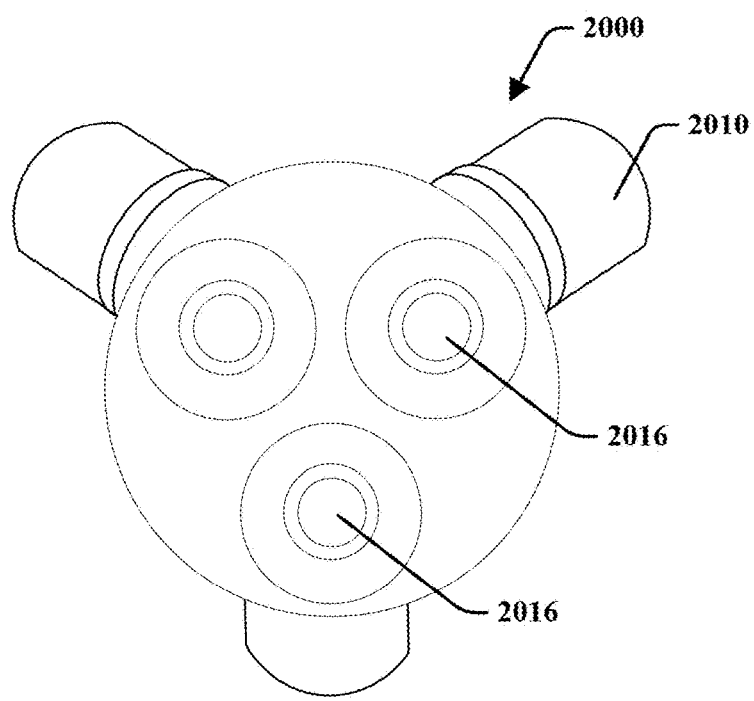
FIG. 35 presents a bottom of the spice dispensing assembly of FIG. 34 in accordance with embodiments of the present disclosure.

FIGS. 34-35 depict a spice dispensing assembly 2000 that may operatively support one or more containers 2010. The one or more containers 2010 may comprise collars 2012 that may attach to a receiving portion 2032 of a support assembly 2030. In an aspect, the collar 2012 may be threaded to interlock with the receiving portion 2032. It is noted that the containers 2010 may be attached to the support assembly 2030 via various other mechanisms, such as latches or the like. Moreover, the support assembly 2030 may support any number of containers 2010. It is noted that the containers may comprise third party spice containers found in grocery stores or may be containers specifically designed for use with dispenser assembly 2000.

The support assembly 2030 may comprise one or more sensors 2020 that may sense an event and cause a spice to be dispensed via one or more grinders 2016. In another aspect, the support assembly 2030 may comprise a motor, power source, and the grinder 2016.

While support assembly 2030 is described as comprising the sensors 2020, a motor, a power source and the grinder 2016, it is noted that the containers 2010 may comprise sensors motor, power source, and the grinder 2016 as described herein. Moreover, the various disclosed support assemblies may include aspects of support assembly 2030, and vice versa. For instance, support assemblies described in the various other figures may comprise one or more sensors motors, power sources, and the grinders.

Figure 36:
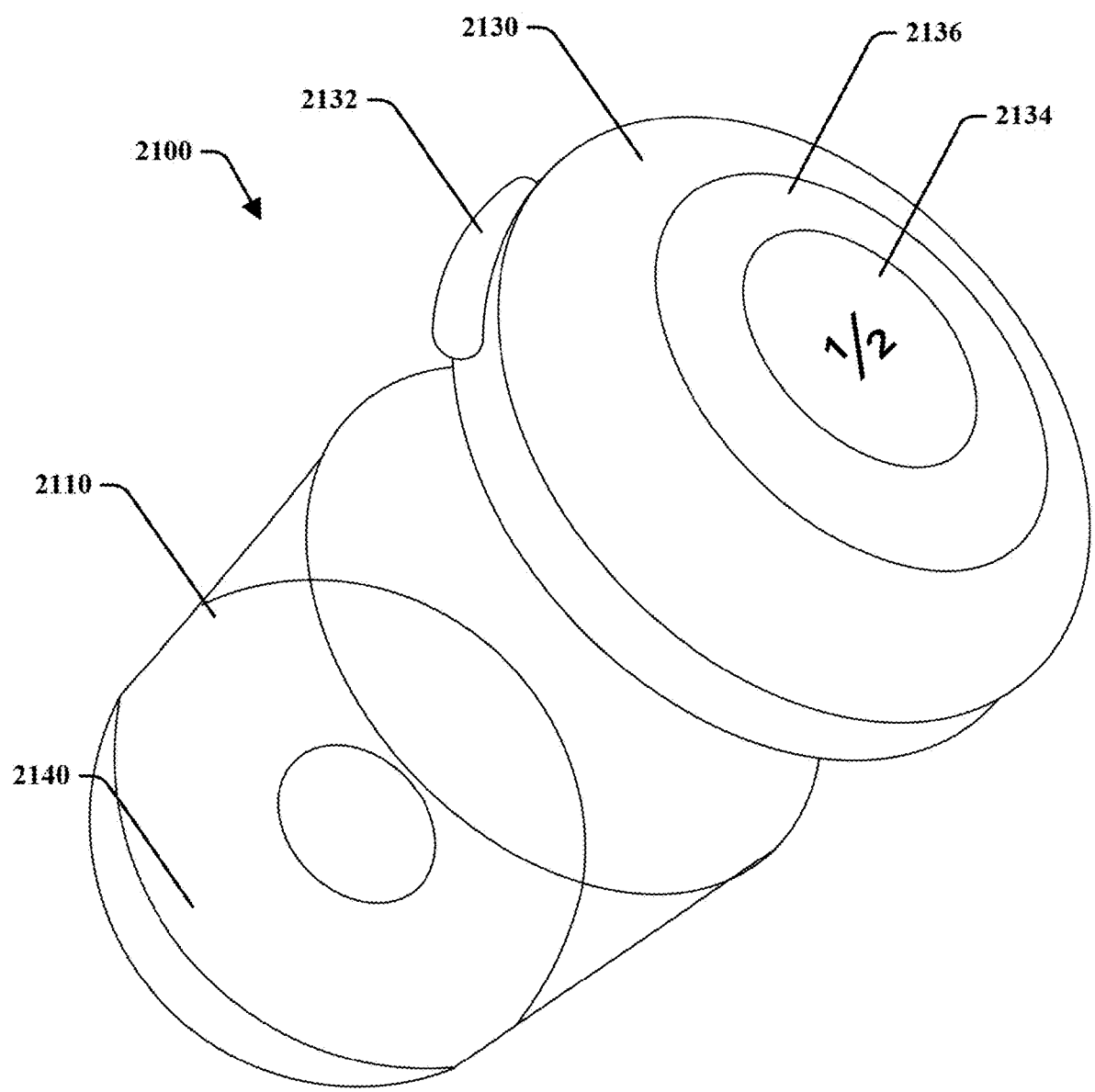
FIG. 36 presents a side perspective view of a spice dispenser including a display interface in accordance with embodiments of the present disclosure.

FIG. 36 is a spice dispenser 2100 that may be utilized with one or more spice support assemblies and/or as a stand-alone dispenser. The spice dispenser 2100 may include a container 2110, a lid 2130, and a grinder 2140. In an aspect, the grinder 2140 may comprise a grinding head, motor, and/or power supply. The grinder 2140 and the lid 2130 may be connected via a wired or wireless connection. The connection may allow the lid 2130 to communicate and/or provide power to the grinder 2140. According to at least one embodiment, a drive shaft (not shown) may extend from the lid 2130 to the grinder 2140. The lid 2130 may comprise a power supply and a motor that drives the grinder. It is noted that various other configurations are within the scope and spirit of this disclosure.

Lid 2130 may comprise a lip 2132 that may allow a user to operatively remove the lid 2130 from the container 2110 to access spices within the container. The lid 2130 may also include an interface 2134. As described here as well as elsewhere in this disclosure, the interface 2134 may comprise a display screen (e.g., LCD screen, touch screen, capacitive interface, etc.), physical buttons or knobs, or the like. The interface 2134 may allow a user to adjust parameters for grinding. For instance, a user may spin or touch a controller 2136 to indicate a grinding granularity, an amount to dispense, or to configure other parameters.

Since many modifications, variations, and changes in detail can be made to the described preferred embodiments of this disclosure, it is intended that all matters in the foregoing description and shown in the accompanying drawings be interpreted as illustrative and not in a limiting sense. Thus, the scope of this disclosure should be determined by the appended claims and their legal equivalents.

What is claimed is:

1. A spice dispenser for dispensing spices, comprising:
    a container operatively receiving spices;
    a sensor operatively sensing a triggering event, wherein the triggering event is touch free; and
    a dispensing mechanism that comprises a grinder and a motor, wherein the sensor is operatively coupled with the motor and wherein the motor operatively moves the grinder relative to the container and operatively dispenses the spices from within the container in response to the sensor sensing the triggering event,
    wherein the motor moves the grinder in response to the sensor sensing the triggering event; and wherein the grinder comprises a grinder plate including a plurality of holes therethrough.

2. The spice dispenser of claim 1, wherein the sensor is positioned on or within the container.

3. The spice dispenser of claim 1, further comprising an attachment member that is capable of operatively attaching the spice dispenser to a support assembly.

4. The spice dispenser of claim 1, further comprising a power source that powers the dispensing mechanism.

5. The spice dispenser of claim 4, wherein the power source comprises a rechargeable battery disposed within the container.

6. The spice dispenser of claim 1, wherein the sensor comprises a motion sensor.

7. The spice dispenser of claim 1, wherein the sensor comprises an audio sensor and a processor coupled to the audio sensor, the processor configured to identify a command received by the audio sensor, and control the dispenser mechanism based on the received command.

8. The spice dispenser of claim 1, further comprising an interface that operatively selects a parameter for dispensing.

9. The spice dispenser of claim 8, wherein the interface comprises a display screen.

10. The spice dispenser of claim 8, wherein the interface comprises a manual switch.

* * * * *